(12) United States Patent
Sotzing et al.

(10) Patent No.: US 8,178,629 B2
(45) Date of Patent: May 15, 2012

(54) CONJUGATED POLYMER FIBER, PREPARATION AND USE THEREOF

(75) Inventors: Gregory A. Sotzing, Storrs, CT (US); Patrick T. Mather, Chagrin Falls, OH (US)

(73) Assignee: University of Connecticut, Farmington, CT (US)

( * ) Notice: Subject to any disclaimer, the term of this patent is extended or adjusted under 35 U.S.C. 154(b) by 1108 days.

(21) Appl. No.: 11/343,552

(22) Filed: Jan. 31, 2006

(65) Prior Publication Data

US 2007/0089845 A1 Apr. 26, 2007

Related U.S. Application Data

(60) Provisional application No. 60/648,588, filed on Jan. 31, 2005.

(51) Int. Cl.
*C08F 283/00* (2006.01)
(52) U.S. Cl. ............... 525/417; 525/326.1; 525/333.8; 525/410; 264/10; 264/449; 264/465
(58) Field of Classification Search .......... 525/417, 525/326.1, 333.8, 410; 264/10, 449, 465
See application file for complete search history.

(56) References Cited

U.S. PATENT DOCUMENTS

| | | | |
|---|---|---|---|
| 4,639,328 A | 1/1987 | Krause et al. | |
| 4,663,001 A | 5/1987 | Lazzaroni et al. | |
| 4,711,742 A | 12/1987 | Jen et al. | |
| 5,162,473 A | 11/1992 | Jen et al. | |
| 5,561,030 A | 10/1996 | Holdcroft et al. | |
| 6,294,245 B1 | 9/2001 | Roitman et al. | |
| 6,645,401 B2 | 11/2003 | Giles et al. | |
| 7,060,846 B2 | 6/2006 | Zahn et al. | |
| 7,071,289 B2 | 7/2006 | Sotzing et al. | |
| 7,094,365 B2 | 8/2006 | Zahn et al. | |
| 7,118,692 B2 | 10/2006 | Nordquist et al. | |
| 7,241,904 B2 | 7/2007 | Zahn et al. | |
| 7,270,871 B2 | 9/2007 | Jiang et al. | |
| 2001/0045547 A1 | 11/2001 | Senecal et al. | |
| 2003/0137083 A1* | 7/2003 | Ko et al. ................... 264/449 |
| 2003/0232195 A1* | 12/2003 | Reneker et al. ............. 428/375 |
| 2004/0074779 A1 | 4/2004 | Sotzing | |
| 2004/0242792 A1* | 12/2004 | Sotzing .................. 525/326.1 |
| 2005/0124784 A1 | 6/2005 | Sotzing | |
| 2005/0209419 A1 | 9/2005 | Zahn et al. | |
| 2005/0287366 A1 | 12/2005 | Okuzaki et al. | |
| 2006/0223977 A1 | 10/2006 | Zahn | |

FOREIGN PATENT DOCUMENTS

| | | |
|---|---|---|
| CA | 2 343 444 | 3/2000 |
| EP | 0577406 A1 | 1/1994 |
| EP | 577406 A1 * | 1/1994 |
| EP | 0999242 A1 | 5/2000 |

(Continued)

OTHER PUBLICATIONS

Andreatta et al, High Performance Fibers of Conducting Polymers, Mol. Cryst. Lid. Cryst. 1990 189, 169-182.*

(Continued)

*Primary Examiner* — Alicia Toscano
(74) *Attorney, Agent, or Firm* — Cantor Colburn LLP

(57) ABSTRACT

Described are conjugated polymer fibers and nanofibers, methods of making, and methods of use thereof. The conjugated polymer fibers and nanofibers can be prepared by an electrostatic spinning process followed by crosslinking.

14 Claims, 6 Drawing Sheets

FOREIGN PATENT DOCUMENTS

| | | |
|---|---|---|
| EP | 1510535 A1 | 2/2005 |
| WO | 0151690 A1 | 7/2001 |
| WO | 03054053 A1 | 7/2003 |
| WO | WO 2005/014693 A1 | 2/2005 |

OTHER PUBLICATIONS

Sotzing et al, Oxidative Solid State Crosslinking of Polymer Precursors to Pattern Intrinsically Conducting Polymers, Polymeric Materials: Science & Engineering 2002, 87, 371.*

Andreatta et al, High Performance Fibers of Conducting Polymers, Mol. Cryst. Liq. Cryst. 1990 189, 169-182.*

Reneker et al, Nanometre diameter fibres of polymer, produced by electrospinning, Nanotechnology, 7, 1996, 216-223.*

Li et al, Nanofibers of conjugated polymers prepared by electrospinning with a two-capillary spinneret, Adav. Mater. 2004, 16, 22, 2062-2066.*

Baba et al., 2 Powerpoint pages of Polym. Mat. Sci. Eng. 2002, 86, 48.

Brzezinski et al., A New, Improved and Convenient Synthesis of 4H-Cyclopenta (2,1-b:3,4-b]- dithiophene-4-one, Synthesis, No. 8, pp. 1053-1056, (2002).

Chen et al., Processable Low Band Gap π-conjugated Polymer, poly(isothianaphthene), Polymer, 37, No. 3, pp. 519-522, (1996).

Gu, Synthesis and Characterization of Poly(2-decylthieno(3,4-b)thiophene), Chem Abstract, 125, 87896 (1996).

Song Y Hong et al., Understanding the Conformational Stability and Electronic Structures of Modified Polymers Based on Polythiopene, Micromolecules 1992, pp. 4652-4657.

Neef et al., Synthesis and Electronic Properties of Poly(2-phenylthieno[3,4-b]thiophen) American Chemical Society, 128, 230943, (1998).

Neef et al., Synthesis and Electronic Properties of Poly(2-phenylthieno[3,4-b]thiophen), American Chemical Society, 131, 214964 (1999).

Pomerantz et al., A New Soluble Low-Bandgap Conducting Polymer, Elservier, 126, 293709 (1997).

Silcoff et al., Synthesis of Polymers with Isolated Thiophene-Based Chromophores, Macromolecules, 31, pp. 9116-9120 (1998).

Sotzing et al., Poly(3,4-ethylenedioxythiophene)(PEDOT) Prepared via Electrochemical Polymerization of EDOT, 2, 2. Bis(3,4-ethylenedioxythiophene) (BiEDOT), and Their TMS Derivatives, Adv. Mater, 9, No. 10, pp. 795-798, (1997).

Watson et al., Polymerizable Monomers, Macromolecules, 33p pp. 4628-4633, (2000).

MacDiarmid, Alan G., "Synthetic Metals": A Novel Role for Organic Polymers (Nobel Lecture); Angewandte Chemie, International Edition (2001)40(14), 2581-2590.

International Search Report; International Application No. PCT/US2006/003764; date mailed Jul. 13, 2006.

Kumar, A. et al.; "Poly(thieno[3,4]furan). A New Low Band Gap Conjugated Polymer", Macromolecules, vol. 39. No. 8, pp. 2724-2725 (2006).

Beh, Weng Sing; et al. "Formation of Patterned Microstructures of Conducting Polymers by Soft Lithography and Applications in Microelectronic Device Dabrication" Adv. Mater; 11; No. 12; 1038-1041.

Chittibabu; et al.: "Synthesis and Properties of a novel Polythiophene derivative with a Side-Chain NLO Chromophore"; Chemistry of Materials, vol. 6; 1994; 1994 pp. 475-480; XP002307545; Experimental Sectionfigure 1.

Dai, Liming, et al; "Photochemical Generation of Conducting Patterns in Polybutadiene Films"; Macromolecules; 1996; 29; 282-287.

Deng, Suxiang; et al Polymethacrylate Functionalized Polypyrrole Network Films on Indium Tin Oxide: Electropolymerization of a Precursor Polymer and Comonomer; Chemistry of Mater.; 2002; 14; 4073-4080.

Di Bartolomeo, C., et al.; "A Photolithographic Technique for Patterning Spin-Coated Polyaniline Filme"; Advanced Materials for Optics and Electronics; vol. 2; 233-236 (1993).

Granlund, T.; et al; "Patterning of Polymer Light-Emitting Diodes With Soft Lithography", O. Chem. M, Adv Mat 2000 12, No. 4, 269-273.

Holdcroft, S.; "Patterning π-Conjugated Polymers" Adv. Mater; 2001; 13; No. 23;Dec. 3; 1753-1765.

Huang, Zheyuan., et al.; "Selective Deposition of Conducting Polymers on Hydroxyl-Terminated Surfaces with Printed Monolayers of Alkylsiloxanes as Templates"; Langmuir; 1997; 13; 6480-6484.

Inaoka, Seiji; et al; Synthesis and Oxidative Cross-Linking of Fluorene-Containing Polymers to Form Conjugated Network Polyfluorenes: Poly(fluoren-9,9-diyl-alt-alkan-$a,w$-diyl); Macromolecules; 2002; 35; 2426-2428.

Jang,Sung-Yeon;"Patterning Polynorbornylenes with Conducting Polymers Utilizing Oxidative Solid-State Crosslinking"; Polymer Program and Department of Chemistry, University of Connecticut ACS-Fall 2002—Boston\gh.

Jang, Sung-Yeon; et al.; "Poly(thiophene)s Prepared via Electrochemical Solid-State Oxidative Cross-linking; A Comparative Study"; Macromolecules 2004 37;4351-4359.

Jang, Sung-Yeon; "Intrinsically Conducting Polymer networks of Poly(thiophene) via Solid-State Oxidative Cross-Linking of a Poly(norbornylene) containing terthiophene Moieties"; Macromolecules; vol. 35; Aug. 9, 2002 7293-7300.

Jang, Sung-Yeon; Poly (Terthiophene) Networks via Electrochemical Crosslinking of Terthiophene Derivatized Norbornylene Monomers and Polymers; Science & Engineering (2002); 86; 205-206.

Jang, Sung-Yeon, et al; "Preprint of Orlando National ACS Conference, Apr. 2002; Poly (Terthiophene) Networks via Electrochemical Crosslinking of Terthiophene Derivatized Norbornylene Monomers and Polymers" (2 pgs).

Jang, Sung-Yeon, et al; "Oxidative Solid-State Cross-Linking of Polymer Precursors to Pattern Intrinsically Conducting Polymers"; American Chemical Society (2004); 874; 44-53.

Jang, S.; Khil, M.; Seshadri, V.; Marquez, M.; Mather, P. T.; Sotzing, G. A. "Electrospinning of electrochromic conductive polymeric nanofibers" *Polymer Preprints* 2005, 46(1), 513-514.

Kahol, P.K., et al; "An EPR Investigation of Electrospun Polyaniline-Polyethylene Oxide Blends"; Synthetic Metals; (2004) 140; 269-272.

Katta, P. et al "Continuous Electrospinning of Aligned Polymer Nanofibers onto a Wire Drum Collector" Nano Lett.; 2004; 4(11) pp. 2215-2218.

Lee et al., Synthesis and Characterization of a Soluble and Transparent Conducting Polymer, Poly (3,4-Ethylenedioxythiophene), Mol. Cryst. 1999, vol. 327. pp. 237-240.

Li, Yan, et al;"Electrochemical AFM "Dip-Pen" Nanolithography" J. Am. Chem. Soc. 2001; 123; 2105-2106.

Li, Dan, et al; "Nanofibers of Conjugated Polymers Prepared by Electrospinning with A Two-Capillary Spinneret"; Advanced Materials; Nov. 18, 2004; vol. 16, No. 22; 2062-2066.

Lim, Jung-Hyurk et al Electrostatically Driven Dip-Pen Nanolithography of Conducting Polymers; Adv. Mater. 2002, 14, No. 20, Oct. 16, 2002 14-74.

Lowe, Jimmy; et al. "Poly(3-(2-acetoxyethyl)thiophene): a model polymer for acid-catalyzed lithography."; Synthetic Metals; 85;(1997);1427-1430.

MacDiarmid, A.G., et al; "The Concept of Secondary Doping As Applied To Polyaniline"; Synthetic Metals (1994) vol. 65; 103-116.

MacDiarmid, Alan G., et al; "Secondary Doping in Polyaniline"; Synthetic Metals; (1996) vol. 69; 85-92.

Marsitzky, Dirk; et al.;"Amorphous Poly-2,7-flouorene Networks" Chemiistry of Materials, American Chemical Society, Washington, US, vol. 13; Oct. 13, 2001; pp. 4285-4289.

Maynor, Benjamin W.; et al.; "Direct-Writing of Polymer Nanostructures: Poly(thiophene) Nanowires on Semiconducting and Insulating Surfaces"J. Am. Chem. Soc.; vol. 124; No. 4; 2002; p. 522-523.

Maynor, Benjamin W., et al; "Au "Ink" for AFM "Dip-Pen" Nanolithography"; Langmuir; 2001; 17;2575-2578.

Norris, Ian D., et al; "Electrostatic Fabrication of Ultrafine Conducting Fibers: Polyaniline/Polyethylene Oxide Blends"; Synthetic Metals 2000; vol. 114; 109-114.

Noy, Aleksandr; et al. "Fabrication of Luminescent Nanostructures and Polymer Nanowires Using Dip-Pen Nanolithography";Nano Letters; 2002; vol. 2; No. 2;109-112.

Persson, S. H. Magnus, et al. "Patterning of Poly(3-Octylthiophene) Conducting Polymer Films by Electron Beam Exposure" Adv. Mater; 1996; 8; No. 5; 405-408.

Pinto, N.J., et al; "Electrospun Polyaniline/Polyethylene Oxide Nanofiber Field-Effect Transistor"; Applied Physics Letters; Nov. 17, 2003; vol. 83, No. 20, 4244-4246.

Reeves, Benjamin D., et al; Dual Cathodically and Anodically Coloring Electrochromic Polymer Based on a Spiro Bipropylenedioxythiophene [(Poly(spiroBiProDOT)]; Advanced Materials; May 17, 2002, vol. 14, No. 10; 717-719.

Renak, Michelle L., et al.; "Microlithographic Process for Patterning Conjugated Emissive Polymers";Adv. Mater; 1997; 9;No. 5; 392-394.

Roncali, M., et al; "Enhancement of the Mean Conjugation Length in Conducting Polythiophenes"; Synthetic Metals; 1987; vol. 18; 139-144.

Rozsnyai, Lawrence F., et al "Selective Deposition of Conducting Polymers via Monolayer Photopatterning"; Langmuir; 1995; 11; 3913-3920.

Schanze, Kirk S., et al; "Photolithographic Patterning of Electroactive Polymer Films and Electrochemically Modulated Optical Diffraction Gratings"; Adv. Mater; 1996; 8;No. 6; 531-534.

Sirringhaus, H., et al; "Integrated Optoelectronic Devices Based on Conjugated Polymers", Science; 1998; 280; 1741-1744.

Sotzing, G.A., et al; Preparation and Characterization of Fully Conjugated Intrinsically Conducting Polymer Networks;Science & Engineering 2002; 86; 40-41.

Sotzing, Gregory A.; et al., Oxidative Solid-State Crosslinking of Polymer Precursors to Pattern Intrinsically Conducting Polymers; Polymeric Materials; Science & Engineering; 2002; 87; 371.

Sotzing, Gregory A., et al.;"Oxidative Solid-State Crosslinking of Polymer Precursors to Pattern Intrinsically Conducting Polymers";Preprint Presentation; Aug. 2002; Boston; 224th National ACS meeting.

Taranekar, Prasad; et al; Distinct Surface Morphologies of Electropolymerized Polymethylsiloxane Network Polypyrrole and Comonomer Films; Langmuir; (2002); 18(21); 7943-7952.

Theron, A., et al; "Electrostatic Field-Assisted Alignment of Electrospun Nanofibers"; Nanotechnology 2001; vol. 12; 384-390.

Venugopal, G., et al.; "Photoinduced Doping and Photolithography of Methyl-Substituted Polyaniline"; Chem.Mater; 1995;7; 271-276.

Watson, K. J.; et al.; "Norbornenyl-Substituted Thiophenes and Terthiophenes: Novel Doubly Polymerizable Monomers"; Macromolecules, American Chemical Society; Easton, US; vol. 33; No. 13; Jun. 27, 2000; pp. 4628-4633.

Xia, Chuanjun; et al.; "Surface Grafting of Conjugated Polymers onto Self-assembled Monolayer Modified Conducting Substrates by Electrochemistry" ; Chem. Mater; 2001; 13; 1682-1691.

Xia, Chuanjun; et al; "Ultrathin Film Electrodeposition of Polythiophene Conjugated Networks through a Polymer Precursor Route"; Langmuir (2001); 17; 7983-7898.

Yu, J. et at "Chemically Amplified Soft Lithography of a Low Band Gap Polymer" S. Chem. Commun. 2001, 1274-1275.

Yu, Jianfei; et al; "Chemically amplified photolithography of a conjugated polymer" Chem. Commun.; 1998; 1503-1504.

Zhou, Yangxin, et al; "Fabrication and Electrical Characterization of Polyaniline-Based Nanofibers With Diameter Below 30 nm"; Applied Physics Letters; Nov. 3, 2003; vol. 83, No. 18; 3800-3802.

International Search Report; International Application No. PCT/US2004/005913.

Carlberg, et al.; "Ionic Transport and Electronic Structure in Poly(3,4-ethylenedioxythiophene"; Solid State Ionics; 85; pp. 73-78; (1996).

Jang, et al.; "Welded Electrochromic Conductive Polymer Nanofibers by Electrostatic Spinninng"; Adv. Mater.; 17; pp. 2177-2180; (2005).

Kumar, et al.; "Conducting Poly(3,4-alkylenedioxythiophene) Derivatives as Fast Electrochromics with High-Contract Ratios"; Chem. Mater.; 10; pp. 896-902; (1998).

Ner, et al.; "Enhanced Fluorescence in Electrospun Dye-Doped DNA Nanofibers"; Soft Matter; 4; pp. 1448-1453; (2008).

Ramakrishna et al; "Polymer Solubility"; Section 2.2.2; in "An Introduction to Electrospinning and Nanofibers"; World Scientific Publishing Co. Pte. Ltd.; USA office: Hackensack, NJ; p. 66-73; ISBN 981-256-415-2; (2005).

Ko et al., "Electrostatic fabrication of ultrafine conducting fibers: polyaniline/polyethylene oxide blends", Synthetic Metals, vol. 114, Issue 2, Aug. 1, 2000, pp. 109-114, Abstract only (1 page).

Kahol et al., "Electron paramagnetic resonance investigations of eletrospun polyaniline fibers", Solid State Communications, vol. 124, Issues 5-6, Oct. 2002, pp. 195-197, Abstract only (1 page).

Desai et al., "Phase Characterization and Morphology Control of Electrospun Nanofibers of Pani/Pmma Blends", MRS Proceedings, 2003, 788:L11.52, Abstract Only (1 page).

* cited by examiner

CONJUGATED POLYMER FIBER, PREPARATION AND USE THEREOF

CROSS-REFERENCE TO RELATED APPLICATION

This application claims the benefit of U.S. Provisional Application Ser. No. 60/648,588, filed Jan. 31, 2005.

BACKGROUND OF THE INVENTION

There is an increasing trend to create electronic materials in the nanoscale range, leading to advances in device performance. Inorganic nanowires and carbon nanotubes are known and have been prepared into nanoelectronics and other devices. These materials are typically prepared by chemical vapor deposition, thereby limiting their ability to be processed.

Polymers exhibit a wider range of processability. Polymer nanostructures have been prepared by a variety of methods, including ultra-high energy ultraviolet photolithography, nanoimprint lithography, direct-write lithography, phase separation of block copolymers, electrostatic spinning into nanofibers, and template approaches, to name a few.

Conjugated ("conductive") polymers typically contain rigid aromatic backbones, making them difficult to process into nanostructures. Typically, conjugated polymer nanostructures are formed by a template approach. There are few reports of forming conjugated polymer nanofibers via electrostatic spinning. The reports indicate, however, that an additional polymer needs to be blended with the conjugated polymer in order to effect electrostatic spinning. The additional polymer can later be removed after fiber formation, leaving the conjugated polymer nanofiber. Removal of the additional polymer leads to modification or loss of the original fiber morphology.

There remains a need in the art for a convenient process to prepare and control the formation of conjugated polymer nanostructures. There also remains a need in the art for a convenient process for the preparation of conjugated polymeric fibers having a range of diameters.

BRIEF DESCRIPTION OF THE INVENTION

Disclosed herein is a method of preparing a conjugated polymer fiber comprising electrospinning a solution of intrinsically conductive polymer, intrinsically conductive polymer precursor, or a combination thereof to form a fiber; and crosslinking the intrinsically conductive polymer, intrinsically conductive polymer precursor, or a combination thereof to form a conjugated polymer fiber.

Also provided herein are conjugated polymer fibers, including nanofibers, prepared by electrospinning; and articles comprising the conjugated polymer fibers or nanofibers.

BRIEF DESCRIPTION OF THE DRAWINGS

FIG. 5b. is an expanded view of FIG. 5a.

DETAILED DESCRIPTION OF THE INVENTION

Disclosed herein are methods of preparing conjugated polymer fiber, including nanofibers ("nanowires"), by an electrostatic spinning ("electrospinning" or "E-spinning") method. Conjugated polymer fibers can be prepared using electrostatic spinning of intrinsically conductive polymers (ICP) or intrinsically conductive polymer precursors (ICP precursors) followed by crosslinking of the ICP or ICP precursors to form the conjugated polymer fibers.

Electrostatic spinning is a process similar to a conventional fiber drawing process with the exception that the driving force is an applied electric field. This method takes advantage of the electrostatic repulsions between surface charges. The conjugated polymer fibers produced by this method exhibit different color switching capabilities through modification of the ICP or ICP precursor structure. The color change can switch from one color in the visible spectrum to another. In one example, a blue to orange color switching has been shown for polythiophene conjugated polymer fiber. In addition to switching within the visible spectrum, the conjugated polymer can also exhibit changes in absorption in the infrared and the microwave regions as well. Such polymers can find application in camouflaging heat signals ("thermal camouflage").

The conjugated polymer fiber can be prepared from ICP and ICP precursors, which contain a reactive functionality covalently bonded to it that undergoes a reaction in the solid state and/or the swollen state to bring about crosslinking of the ICP or the ICP precursor to generate ICP. In addition to crosslinking the ICP or the ICP precursor, the ICP or the ICP precursor may be copolymerized or blended with other non-electrically conducting oligomers and/or polymers that possess reactive functionalities which may also be involved in crosslinking. Suitable ICP and ICP precursors, as well as methods of crosslinking the same are disclosed in U.S. Patent Publication 2004/0242792A incorporated herein in its entirety.

Figure 1:
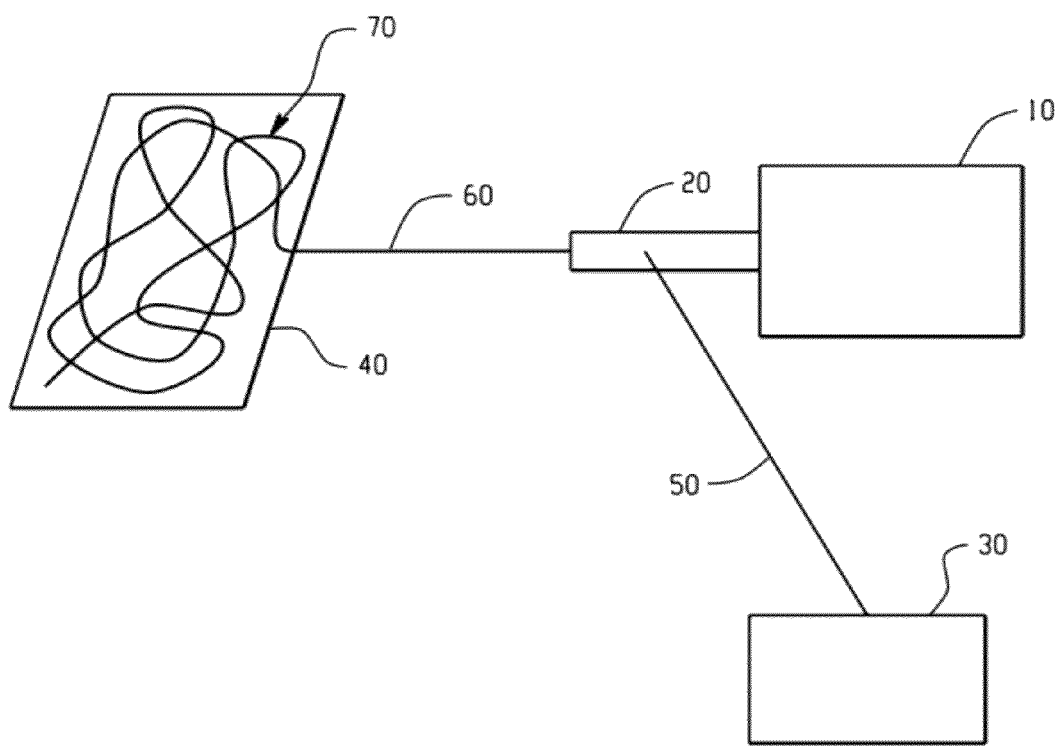
FIG. 1 is an exemplary electrostatic spinning apparatus.

In an exemplary method, electrostatic spinning can include the use of an apparatus containing three general components: a reservoir (10) with a capillary tip (20), a high voltage power supply (30), and a collector (40) (See FIG. 1, not to scale). The reservoir (10) houses a solution of the ICP or ICP precursor that is pumped through a metal capillary (needle) (20) connected to a high voltage DC supply (30) by a metal wire electrode (50). A conductive collector (40), typically metal, is placed at a distance from the capillary tip (20) and is a grounded counter-electrode. Upon applying a high voltage (e.g. about 10 kV or about 20 kV), the electrode imparts an electrical charge to the pendent drop of solution at the end of the capillary tip. The drop experiences two major types of electrostatic force; the electrostatic repulsion between the surface charges and Coloumbic force exerted by the external electric field. Continuous application of high voltage distorts the suspended liquid drop into a conical shape commonly known as a Taylor cone. The liquid jet (60) ejected from the Taylor cone is continuously elongated with complicated stretching and looping motions while the solvent is evaporated resulting in fibers (70) having diameters of nanometer to micrometer scale. The resulting fibers (70) are deposited on the metallic collector (40) as randomly oriented nonwoven mats or can be collected to form aligned fibers. The foregoing is exemplary only, as other apparatuses are also contemplated herein.

The choice of ICP or ICP precursor, solvent, and optional components, can be made to provide a solution with the appropriate rheological properties ($[\eta]c>1$, where $[\eta]$ is the intrinsic viscosity of the solution and c is the solution concentration) that electrospin as fibers rather than electrospray as droplets.

The solution of ICP or ICP precursor generally comprises the ICP or ICP precursor, optionally non-electrically conducting oligomers or polymers, and a solution solvent. The solution solvent chosen generally results in a dilute solution of the oligomeric and polymeric components rather than a suspension. However, if the solution is too dilute, electrospraying of droplets rather than electrospinning into fibers results. The molecular weight of the polymer can be one factor used to determine the appropriate weight percent of the polymer/polymer precursor used in the electrospinning process. Generally, the higher the molecular weight of the polymer, the more dilute the solution can be that will still allow for fiber formation. Exemplary dilute solutions contain about 1 to about 15 weight percent, specifically about 3 to about 10 weight percent, and more specifically about 6 to about 8 weight percent oligomeric or polymeric components based on the total weight of the solution.

Concentration of the solution can affect the resulting thickness of the formed fiber. Decreasing the concentration generally provides a thinner average diameter of the fibers, while increasing the concentration results in a thicker average diameter. Therefore, in one aspect, the morphology of the fiber can be controlled by adjusting the solution concentration. The conjugated polymer fiber can be formed into a wide array of diameters, from nanometer to micrometer. For example, the conjugated polymer fiber can comprise a diameter of up to about 1000 nanometers, specifically about 1 nanometer to about 500 nanometers, more specifically about 5 nanometers to about 250 nanometers, yet more specifically about 10 nanometers to about 100 nanometers, and still yet more specifically about 20 nanometers to about 50 nanometers. "Nanofibers" as used herein means a fiber having an average diameter of less than 1000 nanometers.

The solution solvent can be chosen among solvents possessing enough solvating power to allow a solution as concentrated at 15 wt % (for example to yield $[\eta]c>1$ for typical molecular weights of ICP or ICP precursor), to yield adequate volatility (about $50° C.<T_{boil}<$about $80° C.$), and to feature an adequately high dielectric constant ($\in_r>$about 5). Exemplary solution solvents include lower alkyl ethers, such as diethyl ether, tetrahydrofuran, and the like; halogenated alkanes such as methylene chloride, chloroform, carbon tetrachloride, 1,2-dichloroethane, and the like; acetonitrile; nitrobenzene; dimethylformamide; N-methylpyrrolidone; or the like, or combinations, including blends, thereof.

As mentioned, a potential is applied between the capillary tip of the reservoir and the collector. The potential and distance between the capillary tip and collector is selected so that the effective electrical field strength exceeds about 1 kV/cm, based on experience and depending strongly on surface tension a dielectric constant for the fluid. Accordingly, exemplary potentials of about 8 to about 35 kV can be applied between the capillary tip and the collector, specifically about 10 to about 25 kV, and more specifically about 12 to about 15 kV. The collector can be placed at a distance from the capillary tip of about 2 to about 35 cm, specifically about 5 to about 25 cm, and more specifically about 10 to about 20 centimeters.

The electrospun fibers can be formed into random, nonwoven mats, or oriented to form a structure of aligned fibers. Any method known in the art for aligning electrospun fibers can be used. For example, the fibers can be aligned electrostatically (See, e.g., Nanotechnology 12 (2001) pp. 384-390).

In one embodiment, a nonwoven mat comprising conjugated polymer fiber, is prepared by electrospinning a solution of intrinsically conductive polymer, intrinsically conductive polymer precursor, or a combination thereof to form a fiber; collecting the fiber to form a random, nonwoven mat; and crosslinking the intrinsically conductive polymer, intrinsically conductive polymer precursor, or a combination thereof to form a conjugated polymer fiber nonwoven mat.

In another embodiment, an aligned conjugated polymer fiber structure is prepared by electrospinning a solution of intrinsically conductive polymer, intrinsically conductive polymer precursor, or a combination thereof to form a fiber; collecting the fiber in an aligned configuration to form an aligned fiber structure; and crosslinking the intrinsically conductive polymer, intrinsically conductive polymer precursor, or a combination thereof to form an aligned conjugated polymer fiber structure. Alignment of the conjugated polymer fiber can be used for the polarization of light at different wavelengths while enabling electrochromic switching.

In one embodiment, the nonwoven mat or the structure of aligned ICP fibers can be "welded" together by optimal exposure to solvent vapor to laterally fuse the fibers together. The solvent plasticizes the polymer allowing the fibers to fuse together and provide mechanical integrity to the mat or structure. For example, a nonwoven fabric of a poly(cyclooctene) (not an ICP precursor, but representative of many thermoplastic fibers) was electrospun from 15 weight percent solution in a mixture of (3:2 v/v) tetrahydrofuran:toluene. As electrospun, the nanofibers were not bonded laterally to each other and the fabric was too weak to handle and easily tore without the support of a substrate film. However, exposure to tetrahydrofuran vapor in a closed container for 1 hour or more at 45° C., yielding a vapor pressure of 0.5 bar, yielded laterally welded nanofibers with the fabric achieving excellent handling ability. Exposure of the nanofibers to tetrahydrofuran at lower temperature did not achieve the desired result. Likewise, exposure to solvents that were not good solvents for the polymer, including water and acetonitrile did not result in welded nanofibers of good handling ability.

ICP precursors, as defined herein, are non-conductive polymers, oligomers or monomers that can be rendered electrically conductive (i.e. converted into ICPs) by crosslinking the non-conductive polymer, oligomer or monomer. As defined herein, a copolymer of an ICP precursor with a non-electrically conducting polymer or oligomer is also considered to be an ICP precursor. Crosslinking can result in covalent bonding between two intrinsically conductive polymer molecules or between two intrinsically conductive polymer precursor molecules or between an intrinsically conductive polymer molecule and an intrinsically conductive polymer precursor. During crosslinking, conjugation within an intrinsically conductive polymer precursor may be simultaneously achieved to convert the intrinsically conductive polymer precursor to an intrinsically conductive polymer.

The swollen state as defined herein, is that state wherein the ICP or the ICP precursor increases in volume upon exposure to the solvent without completely dissolving in the solvent. The solid state as defined herein is that state wherein the ICP or the ICP precursor is unswollen by solvents.

In one embodiment, crosslinking has substantially no affect on the fiber morphology as measured by the average diameter of the fiber before and after crosslinking.

Suitable examples of ICPs or ICP precursors include poly(aniline), substituted poly(aniline)s, poly(pyrrole)s, substituted poly(pyrrole)s, poly(thiophene)s, substituted poly(thiophene)s, poly(acetylene)s, poly(ethylenedioxythiophene)s, poly(propylenedioxythiophene)s, poly(ethylenedioxypyrrole)s, poly(propylenedioxypyrrole)s, poly(p-phenylene vinylene)s, polycarbazoles, substituted polycarbazoles, polyindoles, or the like, or combinations comprising at least one of the foregoing ICPs. Other suitable examples of ICPs or ICP precursors are various combinations of the repeat units of pyrrole, substituted pyrrole, thiophene, substituted thiophene, acetylene, ethylenedioxythiophene, substituted ethylenedioxythiophene, ethylenedioxypyrrole, substituted ethylenedioxypyrrole, vinylene, carbazole, substituted carbazole and the like to give polymer. Blends or copolymers or composites of the foregoing ICPs may also be used. Similarly blends or copolymers or composites of an ICP with an ICP precursor may also be used.

The ICPs and/or the ICP precursors may be copolymerized with non-electrically conducting oligomers or polymers. As defined herein, non-electrically conducting oligomers and polymers are those that are not intrinsically electrically conductive such as, for example, polyacetals, polyacrylics, polycarbonates polystyrenes, polyesters, polyamides, polyamide-imides, polyarylates, polyacrylates, polymethylmethacrylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polysiloxane, polyolefins, polynorbornylene, or the like. A copolymer of ICP with a non-electrically conducting polymer is considered to be an ICP. A polymer blend is a composition by which either an electrically conductive or non-electrically conducting polymer is mixed with the precursor polymer.

The copolymers of the ICPs or ICP precursors with the non-electrically conducting oligomers or polymers may be random copolymers, graft copolymers, block copolymers, star block copolymers, dendrimers, or the like, or combinations comprising at least one of the foregoing copolymers. Blends of ICPs or ICP precursors with other polymers may also be used.

The non-electrically conducting oligomers or polymers and the resulting ICPs after oxidative crosslinking of the precursor molecules may generally have molecular weights of about 100 to about 500,000 grams/mole (g/mole). Within this range, it is generally desirable to have molecular weights greater than or equal to about 400, specifically greater than or equal to about 800, and more specifically greater than or equal to about 1000 g/mole. Within this range, it is also desirable to have a molecular weight of less than or equal to about 400,000, specifically less than or equal to about 300,000, and more specifically less than or equal to about 200,000 g/mole.

Exemplary ICPs that may be used include poly(acetylene) and its derivatives shown in (I) below

where R is alkyl, haloalkyl, alkoxy, or haloalkoxy group and n is greater than 6;

poly(thiophenes) and derivatives shown in (II) below

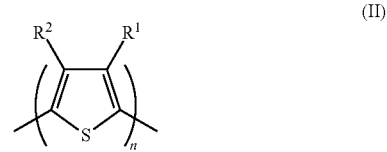

where $R^1$ and $R^2$ may be the same or different and may be hydrogen, alkyl, haloalkyl, alkoxy, haloalkoxy, or aryl and wherein n is greater than 6;

poly(3,4-ethylenedioxythiophene), poly(3,4-ethylenedithiathiophene), poly(3,4-propylenedioxythiophene), poly(3,4-propylenedithiathiophene) and derivatives shown in (III) below

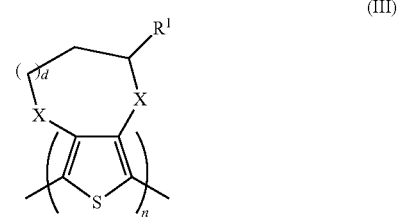

wherein X is sulfur or oxygen, $R^1$ is hydrogen, alkyl, haloalkyl, alkoxy, haloalkoxy, or aryl, d is 0 or 1, and n is greater than 6;

poly(isathianaphthene), poly(pyridothiophene), poly(pyrizinothiophene), and derivatives as shown in (IV) below

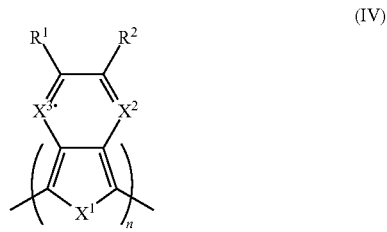

wherein $X^1$ is S, O, N—H, N—$R^3$ where $R^3$ is alkyl, haloalkyl or, aryl; $X^2$ and $X^3$ are the same or different and are C or N; $R^1$ and $R^2$ may be the same or different and may be hydrogen, alkyl, haloalkyl, alkoxy, haloalkoxy, or aryl and n is greater than 6;

poly(pyrrole) and its derivatives as shown in (V) below

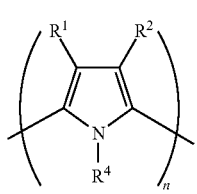
(V)

wherein R⁴ is H, alkyl, haloalkyl or aryl, and R¹ and R² may be the same or different and may be hydrogen, alkyl, haloalkyl, alkoxy, haloalkoxy, or aryl, and n is greater than 6;

poly(3,4-ethylenedioxypyrrole) poly(3,4-ethylenedithiinopyrrole), poly(3,4-propylenedioxypyrrole) poly(3,4-propylenedithiinopyrrole), and derivatives as shown in (VI) below

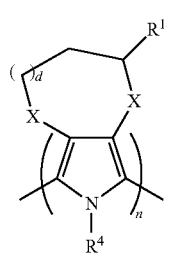
(VI)

wherein X is sulfur or oxygen, R⁴ is H, alkyl, haloalkyl or aryl, R¹ is hydrogen, alkyl, haloalkyl, alkoxy, haloalkoxy, or aryl, d is 0 or 1, and n is greater than 6;

poly(aniline) and its derivatives as shown in (VII) below

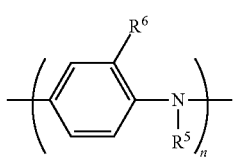
(VII)

wherein R⁵ is hydrogen, alkyl, haloalkyl, aryl, or propanesulfonate and R⁶ is hydrogen, alkyl, haloalkyl, alkoxy, haloalkoxy, aryl, or sulfonate, and n is greater than 6;

poly(phenylenevinylene) and derivatives as shown in (VIII) below

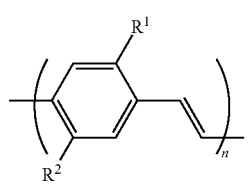
(VIII)

where R¹ and R² are the same of different and are hydrogen, alkyl, haloalkyl, alkoxy, haloalkoxy, or aryl, and n is greater than 6;

poly(p-phenylene) and derivatives as shown in (IX) below

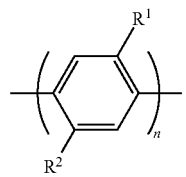
(IX)

wherein R¹ and R² are the same of different and are alkyl, haloalkyl, alkoxy, or haloalkoxy, or aryl, and n is greater than 6;

poly(thionapthene), poly(benzofuran), and poly(indole) and derivatives as shown in (X) below

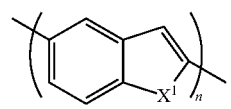
(X)

wherein X¹ is S, O, N—H, N—R³ where R³ is alkyl, haloalkyl, or aryl, and n is greater than 6;

poly(dibenzothiophene), poly(dibenzofuran), and poly(carbazole) and derivatives as shown in (XI) below

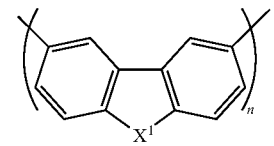
(XI)

wherein X¹ is S, O, N—H, N—R³ where R³ is alkyl, haloalkyl, or aryl, and n is greater than 6;

poly(bithiophene), poly(bifuran), poly(bipyrrole), and derivatives as shown in (XII) below

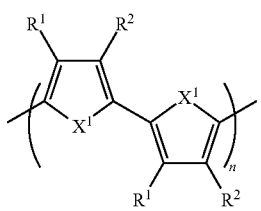
(XII)

wherein each occurrence of X¹ is independently S, O, N—H, N—R³ where R³ is alkyl, haloalkyl, or aryl, each occurrence of R¹ and R² are independently hydrogen, alkyl, haloalkyl, alkoxy, haloalkoxy, or aryl, and n is greater than 6;

poly(thienothiophene), poly(thienofuran), poly(thienopyrrole), poly(furanylpyrrole), poly(furanylfuran), poly(pyrolylpyrrole), and derivatives as shown in (XIII) below

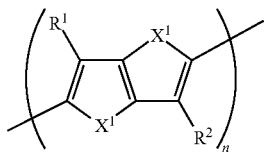
(XIII)

wherein each occurrence of $X^1$ is independently S, O, N—H, N—$R^3$ where $R^3$ is alkyl, haloalkyl, or aryl, wherein $R^1$ and $R^2$ are the same of different and are alkyl, haloalkyl, alkoxy, or haloalkoxy, or aryl, and n is greater than 6;

2-substituted thieno[3,4-b]thiophene and thieno[3,4-b]furan having the structure (XIV) and 6-substituted thieno[3,4-b]thiophene and thieno[3,4-b]furan having the structure (XV)

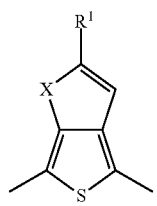
(XIV)

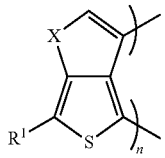
(XV)

wherein X is S or O, $R^1$ is alkyl, haloalkyl, alkoxy, haloalkoxy, or aryl, and n is greater than 6;

poly(terthiophene), poly(terfuran), poly(terpyrrole), and derivatives as shown in (XVI) below:

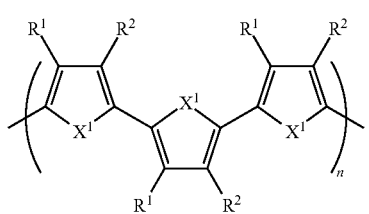
(XVI)

wherein each occurrence of $X^1$ is independently S, O, H—H, N—$R^3$ where $R^3$ is alkyl, haloalkyl, or aryl, wherein $R^1$ and $R^2$ are the same of different and are alkyl, haloalkyl, alkoxy, or haloalkoxy, or aryl, and n is greater than 6;

poly(dithienothiophene), poly(difuranylthiophene), poly(dipyrrolylthiophene), poly(dithienofuran), poly(dipyrrolylfuran), poly(dipyrrolylpyrrole) and derivatives as shown in (XVII) below

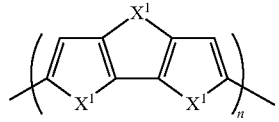
(XVII)

wherein each occurrence of $X^1$ is independently S, O, H—H, N—$R^3$ where $R^3$ is alkyl, haloalkyl, or aryl, and n is greater than 6;

poly(phenyl acetylene) and derivatives as shown in (XVIII) below

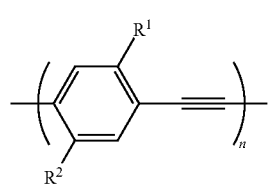
(XVIII)

wherein $R^1$ and $R^2$ are the same of different and are alkyl, haloalkyl, alkoxy, or haloalkoxy, or aryl, and n is greater than 6;

poly(biindole) and derivatives as shown in (XIX) below

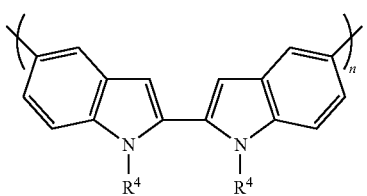
(XIX)

wherein each occurrence of $R^4$ independently is hydrogen, alkyl, haloalkyl, or aryl, and n is greater than 6;

poly(dithienovinylene), poly(difuranylvinylene), poly(dipyrrolylvinylene) and derivatives as shown in (XX) below

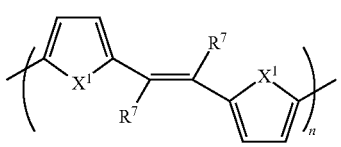
(XX)

wherein each occurrence of $X^1$ is independently S, O, H—H, N—$R^3$ where $R^3$ is alkyl, haloalkyl, or aryl, each occurrence of $R^7$ is independently hydrogen or alkyl, and n is greater than 6;

poly(1,2-trans(3,4-ethylenedioxythienyl)vinylene), poly(1,2-trans(3,4-ethylenedioxyfuranyl)vinylene), and poly(1,2-trans(3,4ethylenedioxypyrrolyl)vinylene), and derivatives as shown in (XXI) below

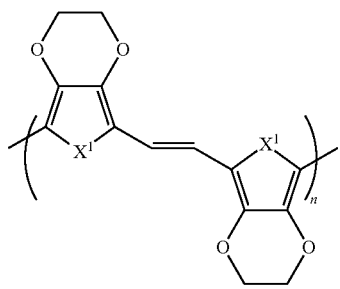

(XXI)

wherein each occurrence of $X^1$ is independently S, O, H—H, N—$R^3$ where $R^3$ is alkyl, haloalkyl, or aryl, and n is greater than 6;

the class of poly(bis-thienylarylenes) and poly(bis-pyrrolylarylenes) and derivatives as shown in (XXII) below

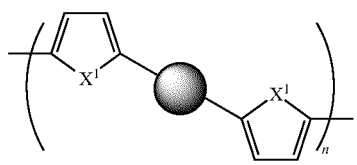

(XXII)

wherein each occurrence of $X^1$ is independently S, O, H—H, N—$R^3$ where $R^3$ is alkyl, haloalkyl, or aryl, and

represents an aromatic ring system; n is greater than 6;

the class of poly(bis(3,4-ethylenedioxythienyl)arylenes) and derivatives as shown in (XXIII) below

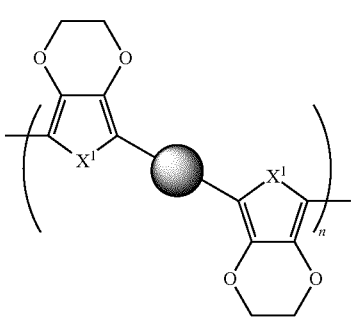

(XXIII)

wherein each occurrence of $X^1$ is independently S, O, H—H, N—$R^3$ where $R^3$ is alkyl, haloalkyl, or aryl, and

represents an aromatic ring system; n is greater than 6;
poly(dithienylcyclopentenone) as shown in (XXIV) below

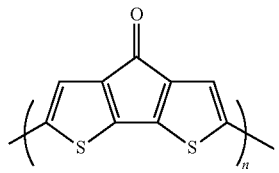

(XXIV)

wherein n is greater than 6;
poly(quinoline) as shown in (XXV) below

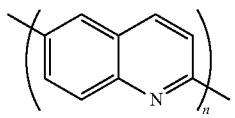

(XXV)

wherein n is greater than 6;
poly(thiazole)) as shown in (XXVI) below

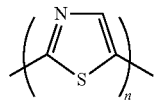

(XXVI)

wherein n is greater than 6;
poly(fluorene) and derivatives as shown in (XXVII) below

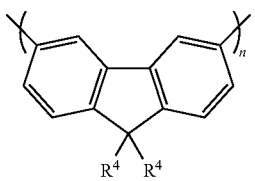

(XXVII)

wherein each occurrence of $R^4$ is independently hydrogen, alkyl, haloalkyl, or aryl, and n is greater than 6; and
poly(azulene) and derivatives as shown in (XXVIII) below

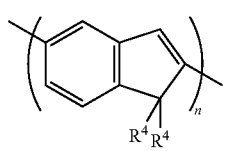

(XXVIII)

wherein each occurrence of $R^4$ is independently hydrogen, alkyl, haloalkyl, or aryl, and n is greater than 6.

As used herein, "alkyl" includes straight chain, branched, and cyclic saturated aliphatic hydrocarbon groups, having the specified number of carbon atoms, generally from 1 to about 12 carbon atoms for the straight chain and generally from 3 to about 12 carbon atoms for the branched and cyclic. Examples of alkyl include, but are not limited to, methyl, ethyl, n-propyl, isopropyl, n-butyl, 3-methylbutyl, t-butyl, n-pentyl, sec-pentyl, cyclopentyl, and cyclohexyl. Specific alkyl groups include lower alkyl groups, those alkyl groups having from 1 to about 8 carbon atoms, from 1 to about 6 carbon atoms, or from 1 to about 4 carbons atoms.

As used herein "haloalkyl" indicates straight chain, branched, and cyclic alkyl groups having the specified number of carbon atoms, substituted with 1 or more halogen atoms, generally up to the maximum allowable number of halogen atoms ("perhalogenated"). Examples of haloalkyl include, but are not limited to, trifluoromethyl, difluoromethyl, 2-fluoroethyl, and penta-fluoroethyl.

As used herein, "alkoxy" includes an alkyl group as defined above with the indicated number of carbon atoms attached through an oxygen bridge (—O—). Examples of alkoxy include, but are not limited to, methoxy, ethoxy, n-propoxy, i-propoxy, n-butoxy, 2-butoxy, t-butoxy, n-pentoxy, 2-pentoxy, 3-pentoxy, isopentoxy, neopentoxy, n-hexoxy, 2-hexoxy, 3-hexoxy, and 3-methylpentoxy.

"Haloalkoxy" indicates a haloalkyl group as defined above attached through an oxygen bridge.

As used herein, the term "aryl" indicates aromatic groups containing only carbon in the aromatic ring or rings. Such aromatic groups may be further substituted with carbon or non-carbon atoms or groups. Typical aryl groups contain 1 or 2 separate, fused, or pendant rings and from 6 to about 12 ring atoms, without heteroatoms as ring members. Where indicated aryl groups may be substituted. Such substitution may include fusion to a 5 to 7-membered saturated cyclic group that optionally contains 1 or 2 heteroatoms independently chosen from N, O, and S, to form, for example, a 3,4-methylenedioxy-phenyl group. Aryl groups include, for example, phenyl, biphenyl, terphenyl, naphthyl, including 1-naphthyl and 2-naphthyl, and bi-phenyl.

"Halo" or "halogen" as used herein refers to fluoro, chloro, bromo, or iodo.

In one embodiment, the ICP is a poly(thiophene). Specific poly(thiophene)s include those having the structural units of the general formulae (XXIX) and/or (XXX):

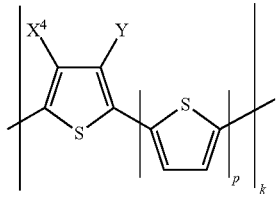

(XXIX)

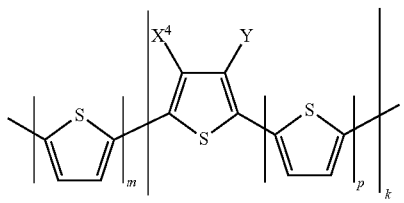

(XXX)

where $X^4$ and Y are either the same or different and may be hydrogen, alkyl, alkoxy, alkoxyalkyl, acyl, alkylene, alkylenedioxy, carboxy, ester, thioacyl, or the like, or combinations of at least one of the foregoing groups having 1 to about 22 carbon atoms, specifically about 1 to about 20 carbon atoms, more specifically about 4 to about 20 carbon atoms, and yet more specifically about 8 to about 18 carbon atoms; and wherein p, m and k may be either the same or different. In general, p and m independently of one another are integers from about 1 to about 10, specifically integers from about 1 to about 6, and k is an integer from about 1 to about 3000, specifically about 1 to about 1000, and more specifically about 1 to about 100.

Exemplary thiophenes that may be used to derive the poly (thiophene) ICPs include 3,4-di(decyl)thiophene, 3,4-di(undecyl)thiophene, 3,4-di(dodecyl)thiophene, 3,4-di(tridecyl) thiophene, 3,4-di(tetradecyl)thiophene, 3,4-di(pentadecyl) thiophene, 3,4-di(hexadecyl)thiophene, 3,4-di(heptadecyl) thiophene, 3,4-di(octadecyl)thiophene, 3,4-di(decyloxy) thiophene, 3,4-di(undecyloxy)thiophene, 3,4-di-(dodecyloxy)thiophene, 3,4-di(tridecyloxy)thiophene, 3,4-di-(tetradecyloxy)thiophene, 3,4-di(pentadecyloxy) thiophene, 3,4-(hexadecyloxy)thiophene, 3,4-di (heptadecyloxy)thiophene, 3,4-di-(octadecyloxy)thiophene, 3,4-di(decyloxyethyl)thiophene, 3,4-di(undecyloxyethyl) thiophene, 3,4-di-(dodecyloxyethyl)thiophene, 3,4-di(tridecyloxyethyl)thiophene, 3,4-di-(tetradecyloxyethyl) thiophene, 3,4-di(pentadecyloxyethyl)thiophene, 3,4-di-(hexadecyloxyethyl)thiophene, 3,4-di(heptadecyloxyethyl) thiophene, 3,4-di-(octadecyloxyethyl)thiophene, 3,4-decyloxy)ethyl)thiophene, 3,4-di((3-decyloxy)propyl) thiophene, 3,4-di((4-decyloxy)butyl)thiophene, 3,4-di(2-(2-(decyloxyethoxyl)ethyl)thiophene, 3,4-di(2-(2-(undecyloxyethoxyl)ethyl)thiophene, 3,4-di(2-(2-(undecyloxyethoxyl)ethyl)thiophene, 3,4-di(2-(2-(dodecyloxy)ethoxy)ethyl)thiophene, 3,4-di(cyclopentyl) thiophene, 3,4-di(cyclopentenyl)thiophene, 3,4-di (cyclohexyl)thiophene, 3,4-di(cyclohexenyl)thiophene, 3,4-di(cyclohexadienyl)thiophene, 3,4-di(phenyl)thiophene, 3,4-di(benzyl)thiophene, 3,4-di(decanoyl)thiophene, 3,4-di (undecanoyl)thiophene, 3,4-di(dodecanoyl)thiophene, 3,4-di (tridecanoyl)thiophene, 3,4-di(tetradecanoyl)thiophene, 3,4-di(pentadecanoyl)thiophene, 3,4-di(hexadecanoyl) thiophene, 3,4-di(heptadecanoyl)thiophene, 3,4-di (octadecanoyl)thiophene, 3,4-di(decanoyloxy)thiophene, 3,4-di(undecanoyloxy)thiophene, 3,4-di(decanoylamino) thiophene, 3,4-di(undecanoylamino)thiophene, 3,4-di(dodecanoylamino)thiophene, 3,4-di(dodecanoylamino) thiophene, 3,4-di(tridecanoylamino)thiophene, 3,4-di (tetradecanoylamino)thiophene, 3,4-di (pentadecanoylamino)thiophene, 3,4-di (hexadecanoylamino)thiophene, 3,4-di (heptadecanoylamino)thiophene, 3,4-di (octadecanoylamino)thiophene, 2,3-dipentylthieno[3,4-b] pyrazine, 2,3-didecylthieno[3,4-b]pyrazine, 2,3-didecylthieno[3,4b]pyrazine, 2,3-didodecylthieno[3,4-b]

pyrazine, 2,3-ditridecylthieno[3,4-b]pyrazine, 2,3-ditetradecylthieno[3,4-b]pyrazine, 2,3-dipentadecylthieno[3,4-b]pyrazine, 2,3-dihexadecylthieno[3,4-b]pyrazine, 2,3-diheptadecylthieno[3,4-b]pyrazine, 2,3-dioctadecylthieno[3,4-b]pyrazine, 2-methyl-3-decyloxythieno[3,4-b]pyrazine-, 2-methyl-3-undecyloxythieno[3,4-b]pyrazine-, 2-methyl-3-dodecyloxythieno[3,4-b]pyrazine-, 2-methyl-3-tridecyloxythieno[3,4-b]pyrazine-, 2-methyl-3-tetradecyloxythieno[3,4-b]pyrazine-, 2-methyl-3-pentadecyloxythieno[3,4-b]pyrazine-2-methyl-3-hexadecyloxythieno[3,4-b]pyrazine-, 2-methyl-3-octadecyloxythieno[3,4-b]pyrazine-, 2-methyl-3-eicosyloxythieno[3,4-b]pyrazine-, 2-methyl-3-docosyloxythieno[3,4-b]pyrazine-, 2-ethyl-3-decyloxythieno[3,4-b]pyrazine-2-ethyl-3-undecyloxythieno[3,4-b]pyrazine-, 2-ethyl-3-dodecyloxythieno[3,4-b]pyrazine-, 2-ethyl-3-tridecycloxythieno[3,4-b]pyrazine-, 2-ethyl-3-tetradecyloxythieno[3,4-b]pyrazine-, 2-ethyl-3-pentadecyloxythieno[3,4-b]pyrazine-, 2-ethyl-3-hexadecyloxythieno[3,4-b]pyrazine-, 2-ethyl-3-octadecyloxythieno[3,4-b]pyrazine-, 2-ethyl-3-eicosyloxythieno[3,4-b]pyrazine-, 2-ethyl-3-docosyloxythieno[3,4-b]pyrazine, 2-phenyl-3-decyloxythieno[3,4-b]pyrazine-, 2-phenyl-3-undecyloxythieno[3,4-b]pyrazine-, 2-phenyl-3-dodecyloxythieno[3,4-b]pyrazine-, 2-phenyl-3-tridecyloxythieno[3,4-b]pyrazine-, 2-phenyl-3-tetradecyloxythieno[3,4-b]pyrazine-, 2-phenyl-3-pentadecyloxythieno[3,4-b]pyrazine-, 2-phenyl-3-hexadecyloxythieno[3,4-b]pyrazine-, 2-phenyl-3-heptadecyloxythieno[3,4-b]pyrazine-, 2-phenyl-3-octadecyloxythieno[3,4-b]pyrazine-, 2-phenyl-3-eicosyloxythieno[3,4-b]pyrazine-, 2-phenyl-3-docosyloxythieno[3,4-b]pyrazine, 2,3-di(decyloxy)thieno[3,4-b]pyrazine, 2,3-di(undecyloxy)thieno[3,4-b]pyrazine, 2,3-di(dodecyloxy)thieno[3,4-b]pyrazine, 2,3-di(tridecyloxy)thieno[3,4-b]pyrazine, 2,3-di(tetradecyloxy)thieno[3,4-b]pyrazine, 2,3-di(pentadecyloxy)thieno[3,4-b]pyrazine, 2,3-di(hexadecyloxy)thieno[3,4-b]pyrazine, 2,3-di(heptadecyloxy)thieno[3,4-b]pyrazine, 2,3-di(octadecyloxy)thieno[3,4-b]pyrazine, 2,3-di(decyloxyethyl)thieno[3,4-b]pyrazine, 2,3-di(undecyloxyethyl)thieno[3,4-b]pyrazine, 2,3-di(dodecyloxyethyl)thieno[3,4-b]pyrazine, 2,3-di(tridecyloxyethyl)thieno[3,4-b]pyrazine, 2,3-di(tetradecyloxyethyl)thieno[3,4-b]pyrazine, 2,3-di(pentadecyloxyethyl)thieno[3,4-b]pyrazine, 2,3-di(hexadecyloxyethyl)thieno[3,4-b]pyrazine, 2,3-di(heptadecyloxyethyl)thieno[3,4-b]pyrazine, 2,3-di(octadecyloxyethyl)thieno[3,4-b]pyrazine, 2,3-di(ethyl-2-oxydecyl)thieno[3,4-b]pyrazine, 2,3-di(propyl-3-oxydecyl)thieno[3,4-b]pyrazine, 2,3-di(butyl-4-oxydecyl)thieno[3,4-b]pyrazine, 2,3-di(cyclopentyl)thieno[3,4-b]pyrazine, 2,3-di(cyclopentenyl)thieno[3,4-b]pyrazine, 2,3-di(cyclohexyl)thieno[3,4-b]pyrazine, 2,3-di(cyclohexenyl)thieno[3,4-b]pyrazine, 2,3-di(cyclohexadienyl)thieno[3,4-b]pyrazine, 2,3-di(phenyl)thieno[3,4-b]pyrazine, 2,3-di(benzyl)thieno[3,4-b]pyrazine, 5,6-di(decyloxy)cyclobuta[b]thieno[3,4-e]pyrazine, 5,6-di(undecyloxy)cyclobuta[b]thieno[3,4-e]pyrazine, 5,6-di(dodecyloxy)cyclobuta[b]thieno[3,4-e]pyrazine, 5,6-di(tridecyloxy)cyclobuta[b]thieno[3,4-e]pyrazine, 5,6-di(tetradecyloxy)cyclobuta[b]thieno[3,4-e]pyrazine, 5,6-di(pentadecyloxy)cyclobuta[b]thieno[3,4-e]pyrazine, 5,6-di(hexadecyloxy)cyclobuta[b]thieno[3,4-e]pyrazine, 5,6-di(heptadecyloxy)cyclobuta[b]thieno[3,4-e]pyrazine, 5,6-di(octadecyloxy)cyclobuta[b]thieno[3,4-e]pyrazine, 5,6-di(cyclopentyloxy)cyclobuta[b]thieno[3,4-e]pyrazine, 5,6-di(cyclopentenyloxy)cyclobuta[b]thieno[3,4-e]pyrazine, 5,6-di(cyclohexyloxy)cyclobuta[b]thieno[3,4-e]pyrazine, 5,6-di(cyclohexenyloxy)cyclobuta[b]thieno[3,4-e]pyrazine, 5,6-di(cyclohexadienyloxy)cyclobuta[b]thieno[3,4-e]pyrazine, 5,6-di(phenyl)cyclobuta[b]thieno[3,4-e]pyrazine, 5,6-di(benzyl)cyclobuta[b]thieno[3,4-e]pyrazine, 2-decyl-1H-thieno[3,4-d]imidazole, 2-undecyl-1H-thieno[3,4-d]imidazole, 2-dodecyl-1H-thieno[3,4-d]imidazole, 2-tridecyl-1H-thieno[3,4-d]imidazole, 2-tetradecyl-1-H-thieno[3,4-d]imidazole, 2-pentadecyl-1H-thieno[3,4-d]imidazole, 2-hexadecyl-1H-thieno[3,4-d]imidazole, 2-heptadecyl-1H-thieno[3,4-d]imidazole, 2-octadecyl-1H-thieno[3,4-d]imidazole, 2-cyclopentyl-1H-thieno[3,4-d]imidazole, 2-cyclopentenyl-1H-thieno[3,4-d]imidazole, 2-cyclohexyl-1H-thieno[3,4-d]imidazole, 2-cyclohexenyl1H-cyano[3,4-d]imidazole, 2-cylohexadienyl-1H-thieno[3,4-d]imidazole, 2-phenyl-1H-thieno[3,4-d]imidazole, 2-benzyl-1H-thieno[3,4-d]imidazole, 2-butylthio-1H-thieno[3,4-d]imidazole, 2-pentylthio-1H-thieno[3,4-d]imidazole, 2-hexylthio-1H-thieno[3,4-d]imidazole, 2-heptylthio-1H-thieno[3,4-d]imidazole, 2-octylthio-1H-thieno[3,4-d]imidazole, 2-nonylthio-1H-thieno[3,4-d]-imidazole, 2-decylthio-1H-thieno[3,4-d]imidazole, 2-undecylthio1H-thieno[3,4-d]imidazole, 2-dodecylthio-1H-thieno[3,4-d]imidazole, 2-tride-cylthio-1H-thieno[3,4-d]imidazole, 2-tetradecylthio-1H-thieno[3,4-d]imidazole, 2-pentadecylthio-1H-thieno[3,4-d]imidazole, 2-hexadecylthio-1H-thieno[3,4-d]imidazole, 2-heptadecylthio-1H-thieno[3,4-d]imidazole, 2-octadecylthio-1H-thieno[3,4-d]imidazol, or the like, or combinations comprising at least one of the foregoing thiophenes.

In general, as stated above, the thiophene or poly(thiophene) may be copolymerized with a monomer that would form a non-electrically conducting polymer or with more than one monomer that would form a non-electrically conducting polymer. The non-electrically conducting polymer may form the backbone, while the poly(thiophene) or the thiophene is grafted onto the backbone. Alternatively, the thiophene or the poly(thiophene) and the non-electrically conducting polymer may be copolymerized to form alternating copolymers, random copolymers, star block copolymers, block copolymers, multi-block copolymers, hyperbranched copolymers, dendrimers, or the like, or combinations comprising at least one of the foregoing copolymers.

In one embodiment, the backbone is a norbornylene with the thiophene grafted onto the norbornylene as shown in formulae (XXXI), (XXXII) and (XXXIII):

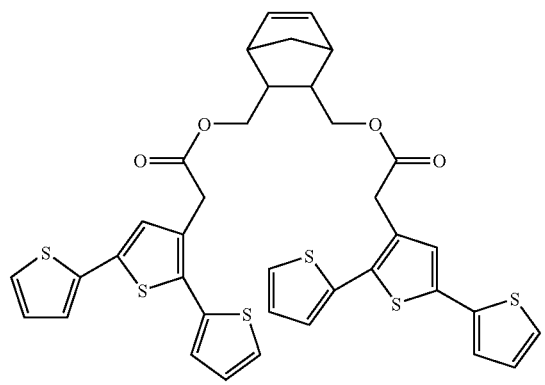

(XXXI)

(XXXII)

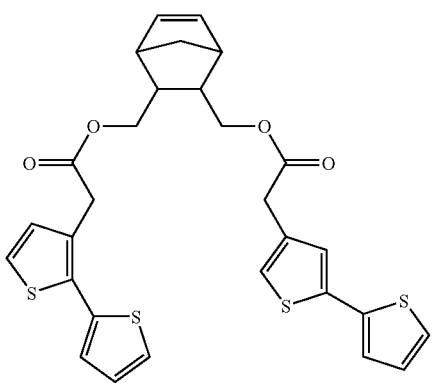

(XXXV)

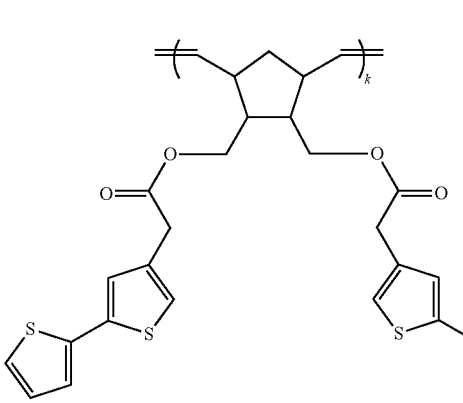

(XXXIII)

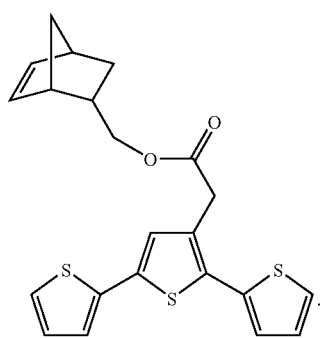

(XXXVI)

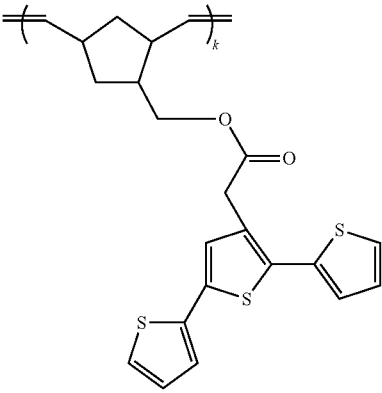

The norbornylene of the structures (XXXI)-(XXXII) is then polymerized to an ICP precursor polynorbornylene with the thiophene grafted onto the polynorbornylene as shown in formulae (XXXIV)-(XXXVI):

where k is about 10 to about 3000, specifically about 20 to about 1000, and more specifically about 50 to about 100.

The covalently bonded thiophene graft in the formula (XXXIV)-(XXXVI) may be polymerized by oxidation, either chemically or electrochemically, to form the structure shown in formula (XXXVII)-(XXXIX) below:

(XXXIV)

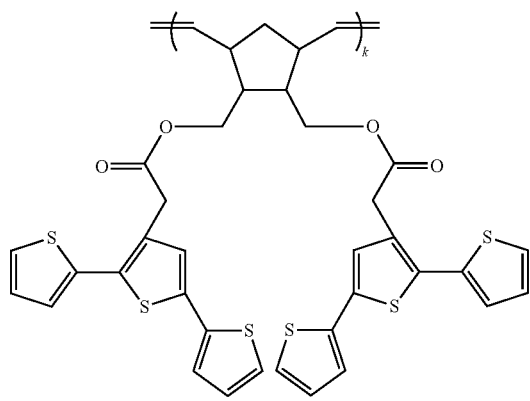

(XXXVII)

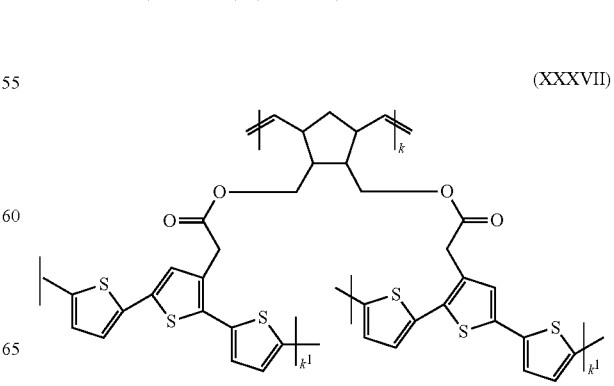

(XXXVIII)

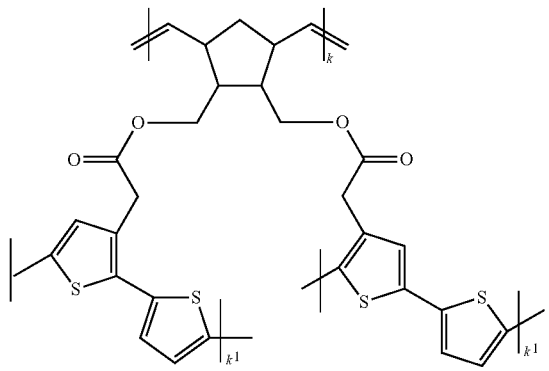

(XXXIX)

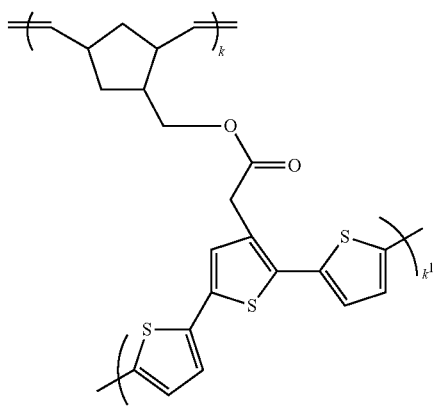

where k is defined above and $k^1$ is about 1 to about 3000, specifically about 10 to about 1000, and more specifically about 20 to about 100.

In another embodiment, bis(terthienyl)norbornylene monomer may be polymerized to obtain the poly(thiophene) shown in formula (XL) or formula (XLI):

(XL)

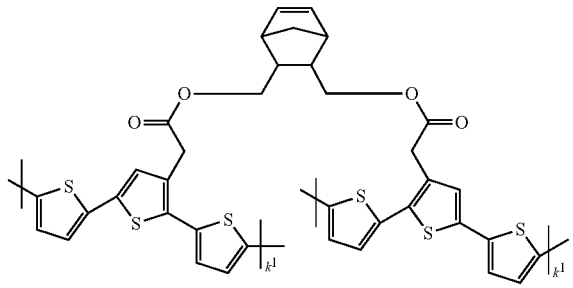

(XLI)

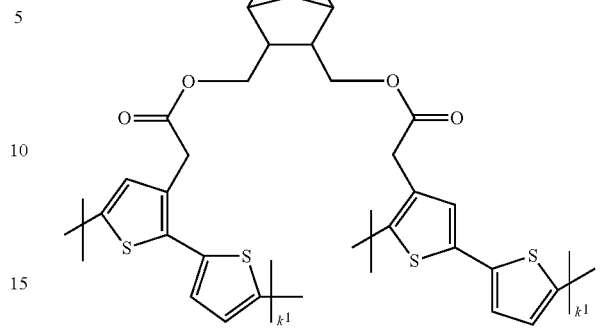

where each $k^1$ is independently about 1 to about 3000, specifically about 10 to about 1000, and more specifically about 20 to about 100. The norbornylene of structures of formula (XL) or formula (XLI) may be later crosslinked if desired to form polynorbornylene.

The polymerization of the thiophene to form the poly(thiophene) also promotes crosslinking of the ICP, since a thiophene or poly(thiophene) graft covalently bonded to a first norbornylene backbone generally reacts with a thiophene or poly(thiophene) graft covalently bonded to a second norbornylene backbone. In the conductive state, there are positive charges on the backbone of the conjugated polymer and negative ions are associated with these positive charges. For example, if ferric chloride were used as the oxidant, then Cl⁻ would be one of the charge-compensating counter-ions. As another example, if the polymerization to form ICP is carried out electrochemically and tetrabutylammonium perchlorate is used as the electrolyte, then perchlorate would be the charge compensating counter-ion.

In another embodiment, the ICP precursor is a polynorbornylene according to formulae (XLII) and XLIII):

(XLII)

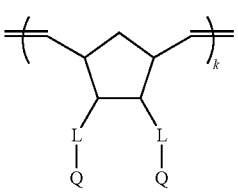

(XLIII)

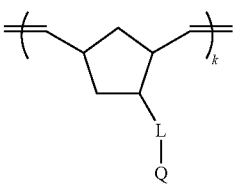

wherein k is about 10 to about 3000, specifically about 20 to about 1000, and more specifically about 50 to about 100; L is a linking group and each Q is independently thiophene, 3,4-ethylenedioxythiophene, 3,4-propylenedioxythiophene, 3,4-propylenedithiathiophene, 3,4-ethylenedithiathiophene, isathianaphthene, pyridothiophene, pyrizinothiophene, pyrrole, 3,4-ethylenedioxypyrrole, 3,4-ethylenedithiinopyrrole, 3,4-propylenedioxypyrrole, 3,4-propylenedithiinopyrrole, aniline, thionapthene, benzofuran, polyindole, dibenzothiophene, dibenzofuran, carbazole, bithiophene, bifuran, bipyrrole, thienothiophene, thienofuran, thienopyrrole, furanylpyrrole, furanylfuran, pyrrolylpyrrole, thieno[3,4-b]thiophene, thieno[3,4-b]furan, terthiophene, terfuran, or terpyrrole, wherein the foregoing are optionally substituted. Exemplary substituents include alkyl, alkoxy, haloalkyl, haloalkoxy, and aryl substituents. The linking group L may include, for example ester, amide, carbamate, carbonate, ether, thioether, amine, alkylene, or arylene functionality and chemically stable combinations thereof. Specifically L can be —CH$_2$—O—C(═O)—CH$_2$— or —CH$_2$—C(═O)—O—CH$_2$—, —O—C(═O)—CH$_2$— or —C(═O)—O—CH$_2$—.

In another embodiment, the ICP precursor is a polynorbornylene according to formulae (XLIV) and (XLV):

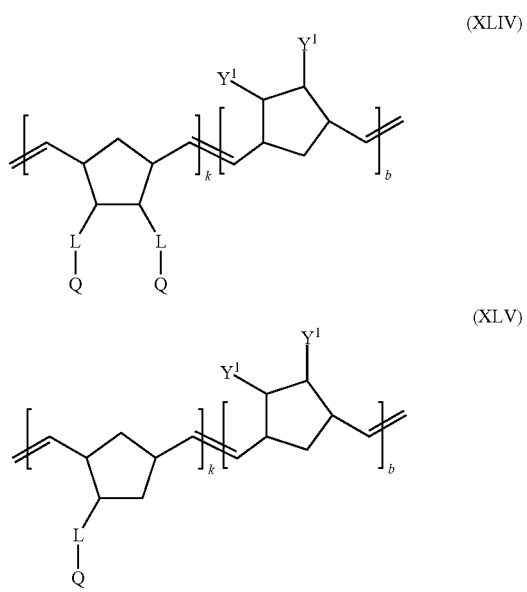

(XLIV)

(XLV)

wherein k is about 10 to about 3000, specifically about 20 to about 1000, and more specifically about 50 to about 100; b is about 1 to about 3000, specifically about 10 to about 1000, and more specifically about 20 to about 100, L is a linking group; each Q independently is thiophene, 3,4-ethylenedioxythiophene, 3,4-propylenedioxythiophene, 3,4-propylenedithiathiophene, 3,4-ethylenedithiathiophene, isathianaphthene, pyridothiophene, pyrizinothiophene, pyrrole, 3,4-ethylenedioxypyrrole, 3,4-ethylenedithiinopyrrole, 3,4-propylenedioxypyrrole, 3,4-propylenedithiinopyrrole, aniline, thionapthene, benzofuran, polyindole, dibenzothiophene, dibenzofuran, carbazole, bithiophene, bifuran, bipyrrole, thienothiophene, thienofuran, thienopyrrole, furanylpyrrole, furanylfuran, pyrrolylpyrrole, thieno[3,4-b]thiophene, thieno[3,4-b]furan, terthiophene, terfuran, or terpyrrole, wherein the foregoing are optionally substituted; and each Y$^1$ is independently hydrogen, alkyl, haloalkyl, alkoxy, haloalkoxy, aryl, or alkylacetate. Exemplary substituents for Q include alkyl, alkoxy, haloalkyl, haloalkoxy, and aryl substituents. The linking group L may include, for example ester, amide, carbamate, carbonate, ether, thioether, amine, alkylene, or arylene functionality and chemically stable combinations thereof. Specifically L can be —CH$_2$—O—C(═O)—CH$_2$— or —CH$_2$—C(═O)—O—CH$_2$—, —O—C(═O)—CH$_2$— or —C(═O)—O—CH$_2$—.

In another embodiment, the ICP precursor is a polynorbornylene according to formulae (XLVI) and (XLVII):

(XLVI)

(XLVII)

wherein k is about 10 to about 3000, specifically about 20 to about 1000, and more specifically about 50 to about 100; b is about 1 to about 3000, specifically about 10 to about 1000, and more specifically about 20 to about 100; q is about 1 to about 3000, specifically about 10 to about 1000, and more specifically about 20 to about 100; L and L$^1$ are linking groups; each Q is independently thiophene, 3,4-ethylenedioxythiophene, 3,4-propylenedioxythiophene, 3,4-propylenedithiathiophene, 3,4-ethylenedithiathiophene, isathianaphthene, pyridothiophene, pyrizinothiophene, pyrrole, 3,4-ethylenedioxypyrrole, 3,4-ethylenedithiinopyrrole, 3,4-propylenedioxypyrrole, 3,4-propylenedithiinopyrrole, aniline, thionapthene, benzofuran, polyindole, dibenzothiophene, dibenzofuran, carbazole, bithiophene, bifuran, bipyrrole, thienothiophene, thienofuran, thienopyrrole, furanylpyrrole, furanylfuran, pyrrolylpyrrole, thieno[3,4-b]thiophene, thieno[3,4-b]furan, terthiophene, terfuran, or terpyrrole, wherein the foregoing are optionally substituted; each Y$^1$ is independently hydrogen, alkyl, haloalkyl, alkoxy, haloalkoxy, aryl, or alkylacetate; and each Z is independently vinyl, acryloyl, methacryloyl, acrylamido, or methacrylamido group. Exemplary substituents for Q include alkyl, alkoxy, haloalkyl, haloalkoxy, and aryl substituents. The linking groups L and L$^1$ may include, for example ester, amide, carbamate, carbonate, ether, thioether, amine, alkylene, or arylene functionality and chemically stable combinations thereof. Specifically, L and L$^1$ can be —CH$_2$—O—C(═O)—CH$_2$— or —CH$_2$—C(═O)—O—CH$_2$—, —O—C(═O)—CH$_2$— or —C(═O)—O—CH$_2$—.

Crosslinking of the ICP's, ICP precursors, and the non-electrically conducting polymers may be brought about by reacting the aforementioned functionalities via anionic polymerization, cationic polymerization, free radical polymerization, addition polymerization, condensation polymerization, or the like, or combinations comprising at least one of the foregoing methods of polymerization.

In one embodiment, functional group is thiophene and the crosslinking is achieved through oxidative radical cation coupling.

The crosslinking can generally be brought about by oxidation. Methods such as chemical oxidation or electrochemical oxidation may be advantageously used to facilitate the crosslinking. Oxidizing agents such as ammonium peroxydisulphate, potassium persulfate, ferric trichloride ($FeCl_3$), iron (III) salts such as, but not limited to, iron (III) tosylate, iron methane sulfonate, salts of permanganates, peracetates, chromates, dichromates, hydrogen peroxide, nitrosyl trifluoromethylsulfonate, nitrosyl bis(trifluoromethylsulfonyl)imide, or the like, or combinations comprising at least one of the foregoing oxidizing agents may be used to facilitate the crosslinking. In the case of electrochemical oxidation, electron transfer between the working electrode and the precursor polymer in the presence of electrolyte carries out the oxidation.

Electrolytes for such oxidative polymerization of the precursor polymer include a solvent and a salt. Examples of solvents for the electrolyte include water, alcohols such as methanol, ethanol, and the like; acetonitrile, butyrolactone, propylene carbonate, ethylene carbonate, ethylene glycol, diglyme, triglyme, tetraglyme, nitromethane, nitrobenzene, benzonitrile, methylene chloride, chloroform and other solvents having dielectric constants of greater than 2. Salts consist of a cation and an anion. Examples of cations for the salt are sodium, lithium, potassium, magnesium, tetrabutylammonium, tetraethylammonium, other tetraalkyl ammonium by which the alkyl groups on the nitrogen could all be the same or be different and the alkyl groups could be branched or linear, imidazolium, and the like. Examples of anions include the halides such as fluoride, chloride, bromide and iodide, perchlorate, tetrafluoroborate, hexafluorophosphate, trifluoromethanesulfonate, bis(trifluoromethansulfonimide), tosylate, mesylate, dodecylsulfonate and any other sulfonated benzene system, camphor sulfonate, naphthalene sulfonate, and any other aromatic sulfonate including polymeric sulfonates such as polystyrene sulfonate. An exemplary oxidizing agent is ferric trichloride for chemical oxidative crosslinking and the electrolyte is tetrabutylammonium perchlorate for electrochemical oxidative crosslinking.

When oxidation is achieved electrochemically, it is the potential of the working electrode that drives the oxidation. The electrolyte that is used for the electrochemistry will therefore affect the type of ICP that is manufactured. For example, when an ICP is crosslinked in lithium tetrafluoroborate, the tetrafluoroborate will be the charge compensating counter-ion. If lithium perchlorate is used then perchlorate will be the counter-ion. There are many different electrolytes that can be used in which the counter-ion could be hexafluorophosphate, tetrafluoroborate, perchlorate, tosylate, trifluorosulfonamide, trifluoromethanesulfonate, or the like, or combinations comprising at least one of the foregoing counter-ions.

In general, in an electrolytic cell, the electrolytic medium comprises an electrolyte and a solvent. The electrolyte gives rise to the charge compensating counter-ions. The electrolytic medium may comprise an amount of about 0.1 M to 5 M, based on the molarity of the electrolyte, specifically about 0.2 to about 3, and more specifically about 0.3 to about 2 based on the molarity of the electrolyte.

For the chemical oxidant, it is generally desirable to employ a molar ratio wherein the moles of oxidant to the moles of the ICP precursor ranges is in an amount of about 0.5 to about 12, specifically about 0.8 to about 11, more specifically about 1 to about 8, and yet more specifically about 1.5 to about 6. The moles of the ICP precursor is the molecular mass of the polymer repeat unit i.e. the molar mass of the pendant crosslinkable group. For example, if terthiophene is the pendant crosslinkable group, the molar mass of this group would be used for the calculation In addition to the oxidizing agents, it may optionally be desirable to add dopants to convert an ICP precursor to an ICP. For example, dopants are often utilized to convert non-conductive forms of poly(aniline) such as leuco emeraldine to conductive forms of poly(aniline) such as emeraldine or prenigraniline. A dopant as defined here is not the same as that defined within conventional semiconductors like indium-doped tin oxide. For conducting polymers, the dopant, in general, refers to the charge compensating dopant ion. For example, for a p-doped polymer, positive charges exist on the polymer backbone and the dopant would be the compensating negative ion, which could be mono, di or trivalent. For example, chloride would be a monovalent ion and sulfate would be a divalent ion. Other "dopant ions" are toluene sulfonate, methanesulfonate, perchlorate, tetrafluoroborate, triflate, or the like, or combinations comprising at least one of the foregoing dopant ions. Doping of the conductive polymer is the process that takes it from the insulating state to the positively charged quinoidal backbone. Doping can be performed electrochemically or chemically. For example, if ferric chloride is used to dope the polymer, then the dopant ion that gets incorporated into the polymer will be chloride.

For polyanilines, dopants are generally strong acids such as p-toluenesulfonic acid, naphthalene disulfonic acid, methane sulfonic acid, hydrochloric acid, chloromethyl sulfonic acid, fluoromethyl sulfonic acid, oxalic acid, sulfosalicylic acid, trifluoroacetic acid, dodecylbenzene sulfonic acid, or the like, or combinations comprising at least one of the foregoing acids. Dopants are generally added in an amount of about 0.05 moles to about 100 moles per mole of group oxidized. Within this range it is generally desirable to have the dopant present in an amount of greater than or equal to about 1 mole per mole of group oxidized, specifically greater than or equal to about 2 moles, and more specifically greater than or equal to about 3 moles, per mole of group oxidized. Within this range it is also desirable to have the dopant present in an amount of less than or equal to about 95 moles, specifically less than or equal to about 90 moles, and more specifically less than or equal to about 75 moles, per mole of group oxidized.

Solvents may optionally be used to swell the ICP precursor to the ICP in order to facilitate the crosslinking. As stated above, if a solvent is used, it is desired that the solvent only swell the ICP precursor without completely dissolving it. The solvent utilized for facilitating the crosslinking of the ICP precursor may be one that can swell either the ICP precursor, the non-electrically conducting polymer or oligomer to which the ICP precursor is covalently bonded, or both the ICP precursor and the non-electrically conducting polymer or oligomer to which the ICP precursor is covalently bonded. Liquid aprotic polar solvents such as propylene carbonate, ethylene carbonate, butyrolactone, acetonitrile, benzonitrile, nitromethane, nitrobenzene, sulfolane, dimethylformamide, N-methylpyrrolidone, or the like, or combinations comprising at least one of the foregoing solvents are generally desirable. Polar protic solvents such as, but not limited to, water, methanol, ethanol, propanol, isopropanol, butanol, or the like, or combinations comprising at least one of the foregoing polar protic solvents may be used. Other non-polar solvents such a benzene, toluene, methylene chloride, carbon tetrachloride, hexane, diethyl ether, tetrahydrofuran, or the like, or combinations comprising at least one of the foregoing solvents may also be used. Co-solvents comprising at least one aprotic polar solvent and at least one non-polar solvent may also be utilized to modify the swelling power of the solvent and thereby adjust the rate of crosslinking of the ICP or the ICP precursor. Ionic liquids, which mainly comprise the imidazolium salts, may also be utilized for swelling the polymer.

The crosslinking of the ICP or the ICP precursor fibers in the solid state to form the crosslinked ICP fibers can take place either in the swollen or the unswollen state. When crosslinked in the swollen state, the solvent may cause the ICP or the ICP precursor to increase in an amount of about 0.1 volume percent (vol %) to about 300 vol % based on the original volume of the ICP or the ICP precursor. Within this range, it is generally desirable to have an increase greater than or equal to about 1 vol %, and specifically greater than or equal to about 4 vol %, based on the original volume of the ICP or the ICP precursor. Within this range, it is also generally desirable to have an increase of less than or equal to about 250 vol %, specifically less than or equal to about 200 vol % and more specifically less than or equal to about 120 vol % based on the original volume of the ICP or the ICP precursor.

Crosslinking can take place by chemical oxidation or by electrochemical oxidation. When a crosslinked ICP is formed via chemical oxidation, the ICP precursor in the solid or swollen state is generally immersed or dissolved in a solution containing the oxidant. The time period for the immersion may vary depending upon the size of the fiber. In general a time period of about 30 seconds to about 180 minutes is desirable, specifically about 45 seconds to about 160 minutes, more specifically about 1 to about 120 minutes, and yet more specifically about 2 to about 60 minutes.

During the chemical oxidation, the temperature may be raised or lowered in order to control reaction and diffusion kinetics. In general, temperatures of about −50° C. to about 100° C. may be employed. Within this range, it is generally desirable to employ temperatures of greater than or equal to about −30° C., specifically greater than or equal to about −10° C., and more specifically greater than or equal to about −5° C. Within this range, it is also desirable to employ temperatures of less than or equal to about 90° C., specifically less than or equal to about 80° C., and more specifically less than or equal to about 50° C. Agitation may be optionally utilized during the process of chemical oxidation.

The ICP precursors may be optionally swollen with solvent prior to or during the electrochemical oxidation process, if desired. In electrochemical oxidation, an ICP precursor fiber is generally applied onto a substrate, which can optionally be utilized as the working electrode in an electrochemical cell or the substrate may be an insulator and an external conductive probe or pattern be utilized as the working electrode. Oxidation generally occurs rapidly upon the application of a voltage sufficient to convert the pendant polymerizable unit to a radical cation. The rate of oxidation is dependent upon a number of factors such as, but not limited to, the amount of swelling, the polarity of the solvent, concentration of the precursor monomer units on the backbone of the precursor polymer, the conductivity of the crosslinked ICP formed and the like.

In general, when electrochemical oxidation is used to bring about crosslinking, a voltage of about 0.1 volt to about 10 volt may be used in the electrochemical cell. Generally, the voltage is dependent upon the oxidation potential of the polymerizable unit of the precursor polymer, specifically the voltage is proportional to the voltage that is desirable at the onset for oxidation of the polymerizable unit and more specifically that the voltage be at the peak for polymerizable unit oxidation. Similarly, within this range it is desirable for the voltage to be less than 1 volt above the peak for polymerizable unit oxidation and more specifically less than 0.8 volt above the peak current for oxidation of the polymerizable unit.

Alternatively it may be desirable to use a current for galvanostatic electrochemical polymerization of about 0.1 milliamperes/cm$^2$ to about 20 amperes/cm$^2$ in the electrochemical cell. Within this range, it is desirable to use a current of greater than or equal to about 0.1, specifically greater than or equal to about 0.3, and more specifically greater than or equal to about 0.5 milliamperes/cm$^2$. Similarly, within this range, it is desirable to use a current of less than or equal to about 18, specifically less than or equal to about 15, and more specifically less than or equal to about 10 amperes/cm$^2$.

In one embodiment, polythiophene fibers are prepared by electrospinning a solution of ICP comprising thiophene followed by solid-state oxidative crosslinking.

Figure 4:
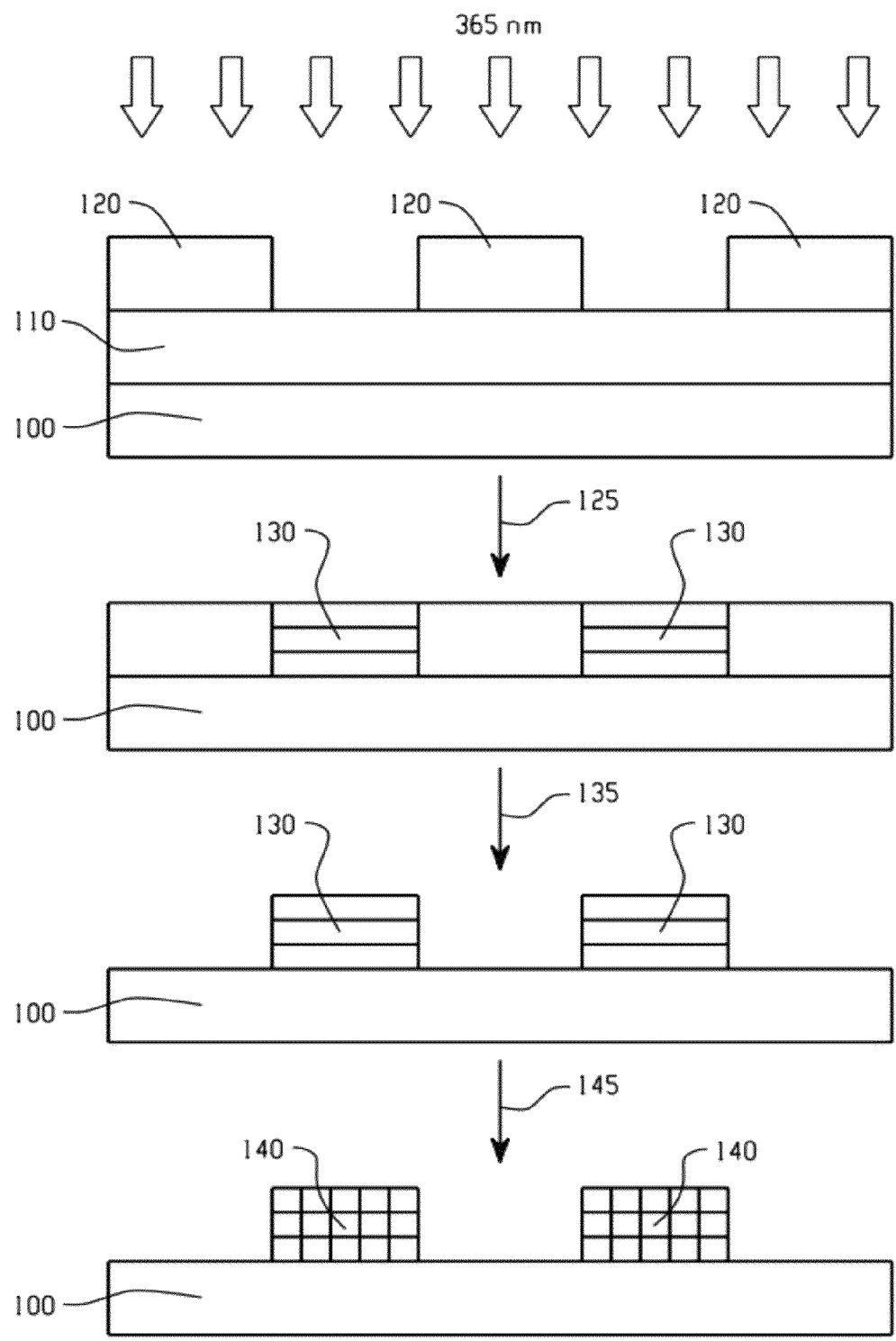
FIG. 4. is a schematic of a general process of micropatterning conjugated polymer fiber.
Figure 5A:
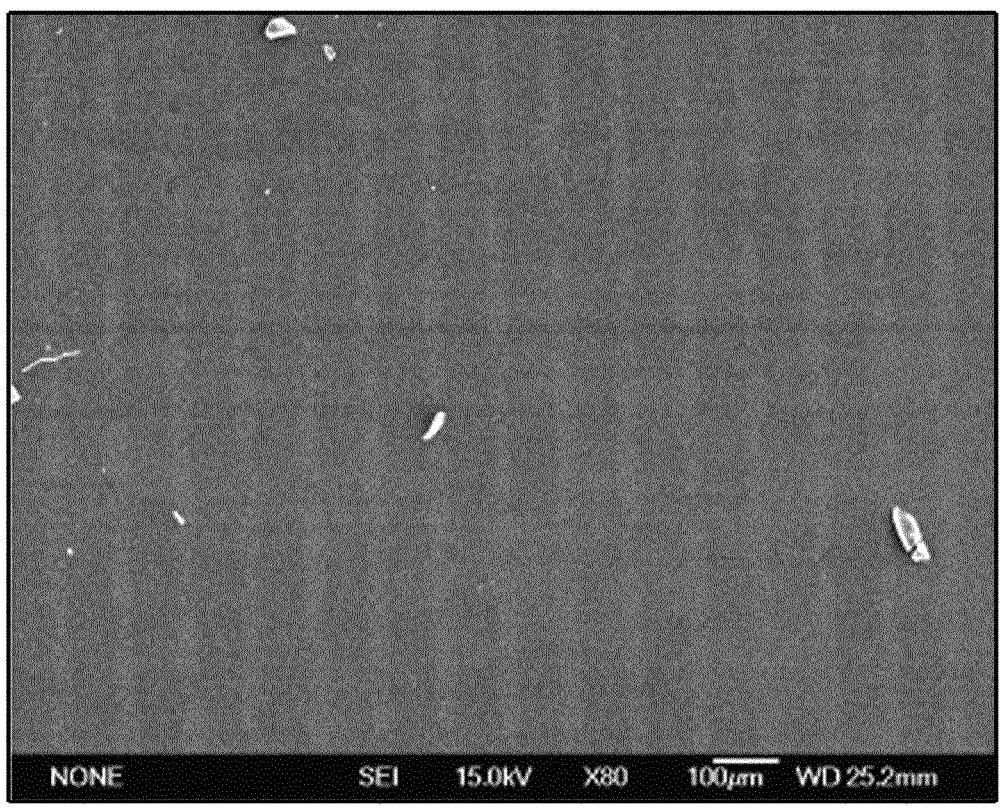
FIG. 5a. is an FESEM image of micropatterned lines of conjugated polymer fiber.
Figure 5B:
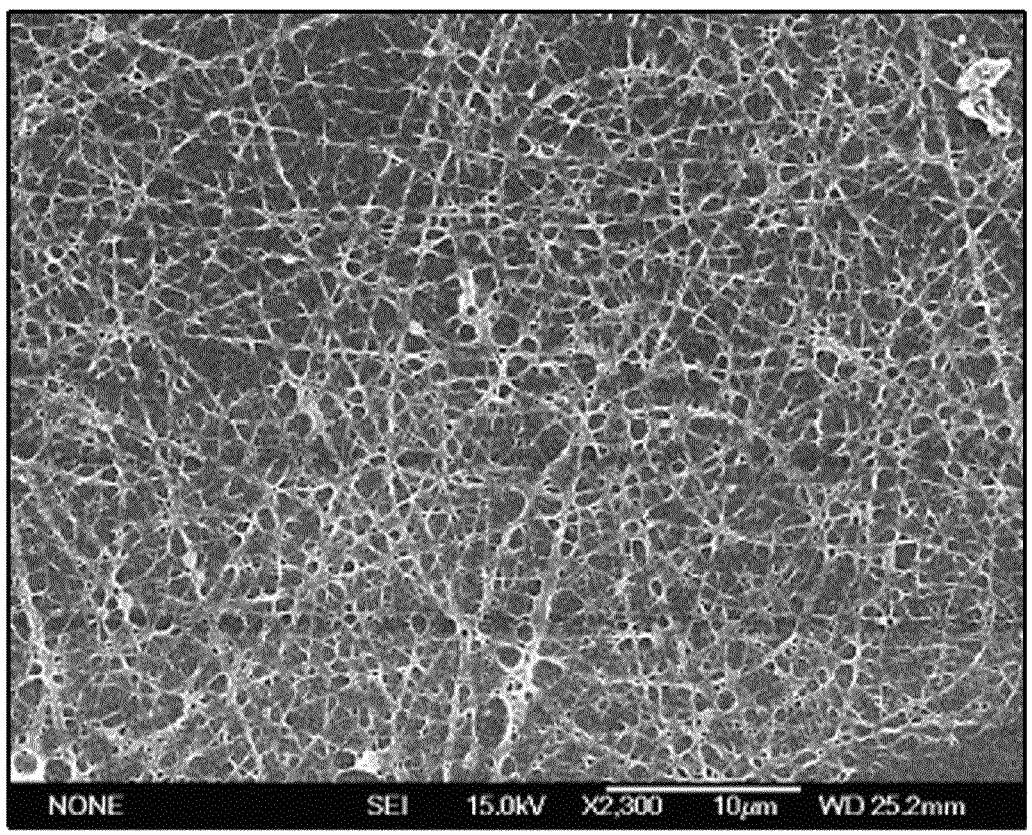

The resulting electrospun fibers can be further processed using standard photolithography techniques to form patterned structures. FIG. 4 illustrates a generalized scheme of micropatterning conjugated polymer fiber. In an exemplary embodiment, ICP, ICP precursor, or a combination thereof are formed into a fiber mat (110) onto a substrate surface (100). The ICP or ICP precursor contains reactive groups that can be radiation crosslinked using ultraviolet light, electron beam, vacuum ultraviolet, or gamma radiation. Exemplary reactive groups include ethylenic unsaturated groups, for example, acrylate, methacrylate, acrylamido, methacrylamido, vinyl, and the like. A photomask (120) is used to provide a desired pattern. Upon exposure to the appropriate source of energy, the exposed portions of fiber mat photochemically crosslink (125). The unexposed areas remain soluble in organic solvents and can be removed in a development step (135) while the photochemically crosslinked portions (130) of the mat remain. The photochemically crosslinked portions (130) can be further processed by oxidative crosslinking to form conjugated polymer fiber portions (140). FIG. 5a. is a Field Emission Scanning Electron Microscope image of micropatterned lines of conjugated polymer fibers. The pale lines are the substrate and the darker lines are the conjugated polymer fiber mat. FIG. 5b. is a close-up of the image of FIG. 5a.; the dark line shown in lower right corner is the edge of the pattern where the ICP precursor polymer mat was removed in the development step.

Photoinitiators may optionally be used to promote the photochemical crosslinking. Any suitable photoinitiator known in the art can be used, including for example, phosphine oxide photoinitiators, ketone-based photoinitiators, such as hydroxy- and alkoxyalkyl phenyl ketones, and thioalkylphenyl morpholinoalkyl ketones; and benzoin ether photoinitiators. The exact range of amounts of photoinitiator may be selected by those skilled in the art.

Articles prepared from the electrospun fibers are suitable for a wide variety of end use applications where conjugation and/or electrical conductivity is desired, including, for example, antistatic garments, antistatic floor coverings, components in computers, and generally, as replacements for metallic conductors, or semiconductors, including such specific applications, as, for example, batteries, fuel cells, photovoltaics, electrostatic dissipation and electromagnetic shielding. They may also be used for example, as antistatic wrappings for electronic equipment or electromagnetic interference shields for computers and other sensitive instruments, including aerospace applications and biomedical devices. Other uses included medical applications such as sensors, drug delivery devices, surgical and diagnostic devices and instruments, or components thereof, conductive polymeric wires or leads for activation of biological processes, and antistatic clothing for use by operating room personnel. Still other applications include optoelectronic device components, transistors, capacitors, wires for circuitry, use in interconnect technology, as hole transport layers for light emitting diodes, as light emitting materials for use in light emitting diodes, as optically transparent conductors/electrodes, high surface area electrodes for chemical and tactile sensing and electrical triggering devices, optical gratings and as electrochromic windows or electrochromic displays, including wearable and flexible displays. The fibers can be used as electrochromics in eyewear (goggles, glasses, etc.) for polarizing filters and the like. Still other applications include membranes for food packaging, force transduction, electrically stimulated actuation, light polarization, flexible resistive heating, and optically transparent flexible resistive heating films.

Those structures formed by photolithography find specific application for displays, specifically electrochromic displays as the micropatterning is a way to pixelate a given color; sensors; actuators; optic filters; chemical and particulate filters; and the like.

The invention is further illustrated by the following non-limiting examples.

EXAMPLE 1

Example 1a

Preparation of ICP Precursor

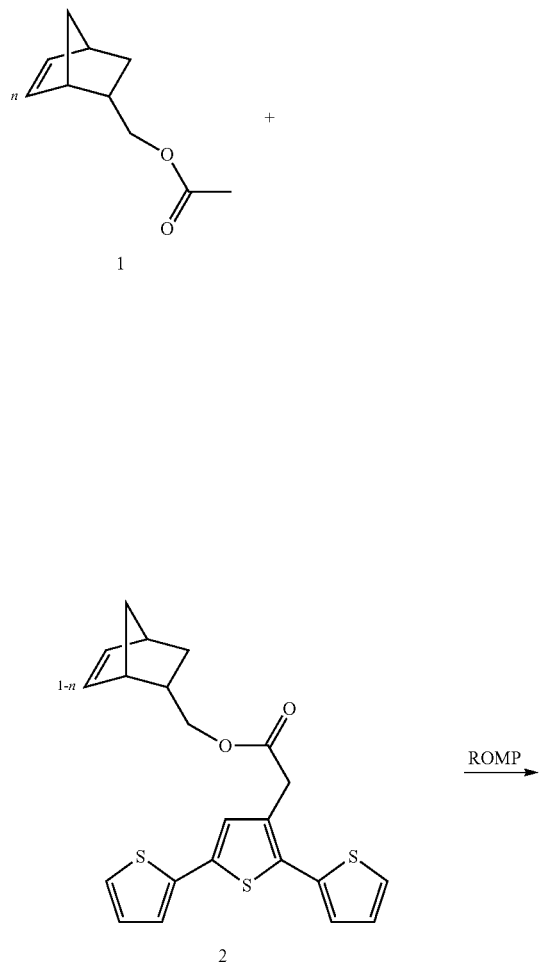

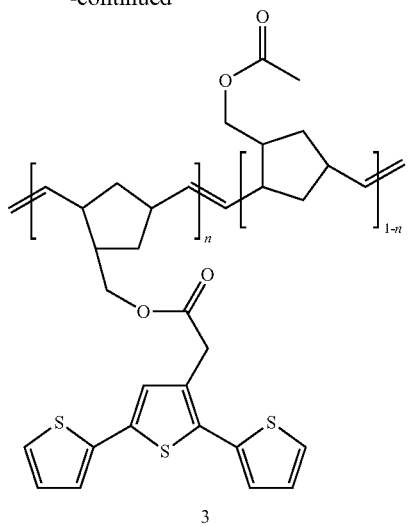

The ICP precursor 3 was prepared by random copolymerization of monomers 1 ((bicyclo[2.2.1]hept-5-en-2-yl)methyl acetate) and 2 ((bicyclo[2.2.1]hept-5-en-2-yl)methyl 2-(2,5-di(thiophen-3-yl)thiophen-3-yl)acetate) in an equal molar ratio via ring opening metathesis polymerization (ROMP) using Grubbs' catalyst (n=0.5). Two millimole (mmol) of monomer 1 and 2 mmol of monomer 2 were dissolved in 10 ml of dry methylene chloride and transferred via cannular into a 100 ml Schlenk flask, previously vacuum dried and nitrogen purged, under nitrogen containing 11 mg (0.013 mmol) of Grubb's alkylidene catalyst and 5 ml of methylene chloride. The mixture was allowed to stir for 30 minutes followed by the irreversible termination by the addition of 3 ml of ethyl vinyl ether. The solution was then concentrated under vacuum. The polymer 3 was precipitated 3 times in pentane (300 ml), filtered and then dried under vacuum. The number average molecular weight of the ICP precursor 3 was measured to be 46,400 g/mol as determined by gel permeation chromatography (GPC). The ICP precursor exhibited a polydispersity index of 1.4.

Cast films of ICP precursor 3 were prepared by drop casting 3 onto a platinum button working electrode using tetrahydrofuran (THF) as the casting solvent and the electrochemical solid-state oxidation crosslinking was studied using cyclic voltammetry in a conventional three-electrode cell in tetrabutylammonium perchlorate/acetonitrile (TBAP/CH$_3$CN) electrolyte solution. Scheme 2 shows the conversion process of 3 to the crosslinked conductive polymer 4.

Scheme 2.

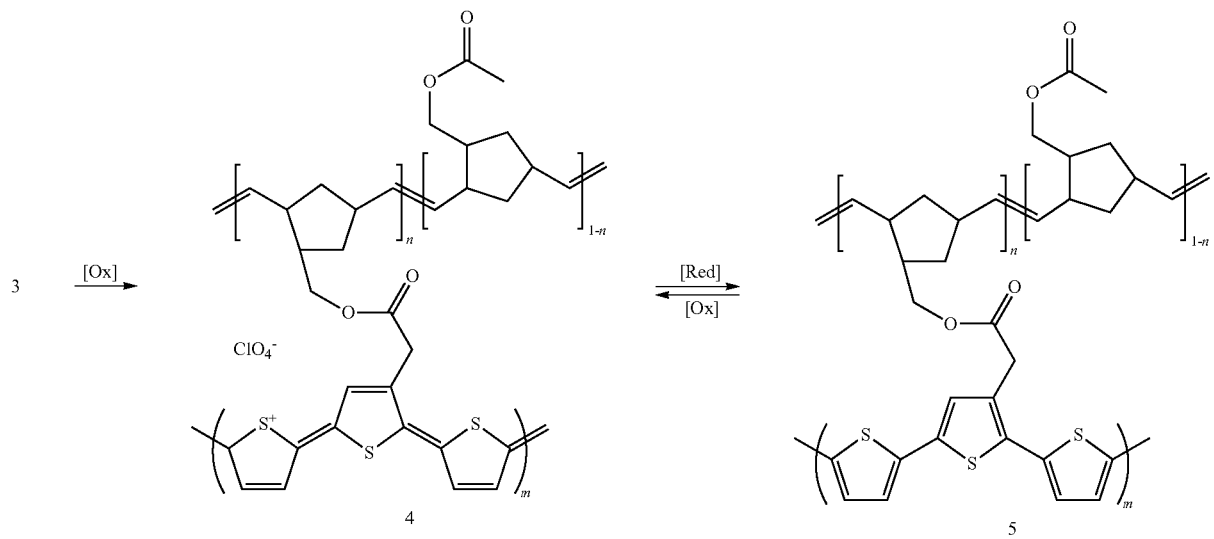

The conversion of ICP precursor 3 to conductive polymer 4 occurs in the solid swollen state at a peak potential of ca. 0.78 V. The blue conductive polymer 4 can be converted to orange conjugated polymer 5 via electrochemical reduction. This process of conversion between 4 and 5 is an electrochemically reversible process occurring at a potential of ca. 0.65 V.

Example 1b

Electrospinning ICP Precursor 3 to Form ICP Precursor Fibers

A custom electrospinning apparatus employed a Genie syringe pump (Kent Scientific) operated at a constant volumetric flow rate of 0.04 ml/h. A needle having an inner diameter of 250 micrometers was oriented downward, facing a circular collector (20 cm in diameter) separated 10 cm from the needle tip. The needle tip was positively electrified, nominally 12 kV, through a strain-relieved connection, while the collector was at ground. The tip electrical potential was controlled by a current-limited 30 kV programmable power supply (Ultravolt, Inc.) that was commanded to ramp linearly to the electrospinning voltage by a Labview program and D/A converter. The actual voltage was adjusted to ca. 12 kV in order to balance the electrically-driven flow rate with the delivered volumetric flow rate of the pump.

The ICP precursor 3 was prepared into fibers by electrospinning a 7 wt % solution of 3 in THF/DMF (70/30) while applying 1 kV/cm with a tip to collector distance of 10 cm. The fibers produced had a diameter ranging from 120 to 180 nm, with an average diameter size of 140 nm.

The diameter of fibers of 3 could be controlled by manipulating the concentration of ICP precursor in the solution. Fibers obtained from 6 wt % solution of 3 in THF/DMF (70/30) while applying 1 kV/cm were found to have a diameter ranging from 90 to 150 nm, with an average diameter size of 110 n. Use of a solution of 3 lower than 4 wt % THF/DMF (70/30) resulted in electrospraying of fine droplets rather than electrospinning.

Samples for microscopic observation were taken selectively from sparse regions of the collector, near the edge, with care not to contaminate the fabric composition or the nonwoven morphology. The thin, nonwoven samples were mounted on electron microscopy stubs and coated with a thin layer of Au/Pd (Polaron E5100 SEM Coating Unit) to prevent fiber charging. Electron microscopic imaging was conducted using a Philips ESEM 2020 operated at 20 kV and with images collected on a digital camera.

Figure 2A:
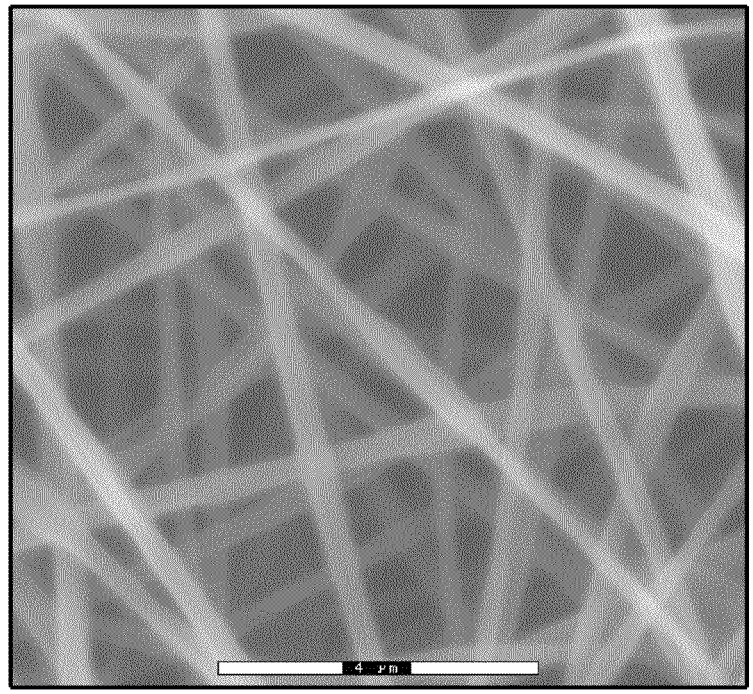
FIG. 2a. is a field emission scanning electron microscope image (FESEM) of intrinsically conductive polymer precursor nanofibers prepared by electrostatic spinning.

FIG. 2a is a field emission scanning electron microscope image of fibers prepared by electrospinning an ICP precursor.

Example 1c

Formation of Conjugated Fibers From ICP Precursor 3 Via Chemical Solid-state Oxidative Crosslinking Intrinsically conductive polymer fibers were prepared by chemical oxidation by dipping the fiber mat of ICP precursor 3 into 0.01 ferric chloride/acetonitrile solution (FeCl$_3$/CH$_3$CN). In a few minutes, the color of the mat changed from opaque white to deep blue indicating a successful chemical solid-state oxidative crosslinking of fibers. According to SEM images, there were no significant changes in the morphology or diameter of the fibers after the chemical solid-state oxidative crosslinking reaction.

Figure 2B:
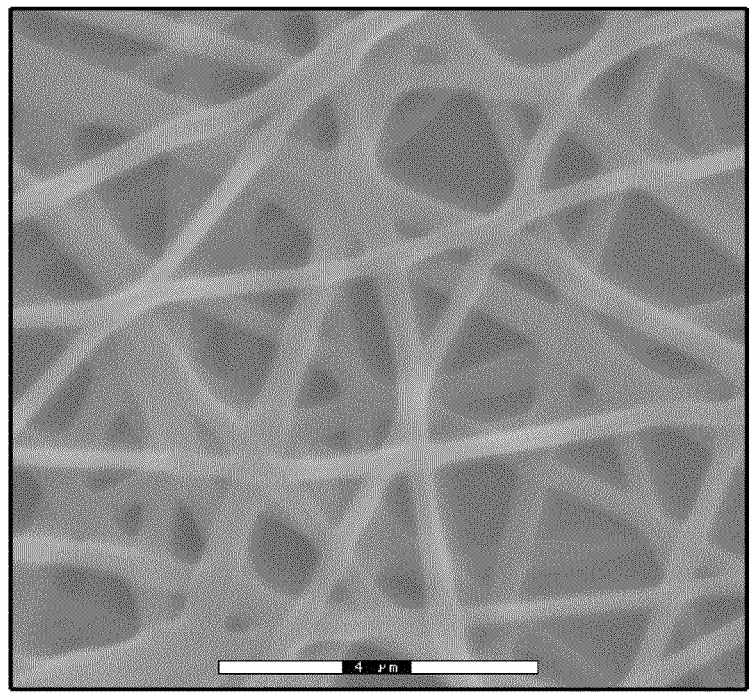
FIG. 2b. is an FESEM image of the nanofibers after solid-state oxidative crosslinking.

FIG. 2b is a field emission scanning electron microscope image of crosslinked fibers after chemical solid-state oxidative crosslinking.

Example 1d

Formation of Conjugated Fibers from ICP Precursor 3 Via Electrochemical Solid-state Oxidative Crosslinking Five micrometer thick fiber mats of a 7 wt % solution of 3 in THF/DMF (70/30) were collected onto indium tin oxide (ITO) coated glass slides. Electrochemical solid-state oxidative crosslinking to prepare fibers of 4 was performed in 0.1 M TBAP/CH$_3$CN via scanning potentials between 0 V and 1.2 V at a scan rate of 100 mV/s; Ag/Ag$^+$ reference (0.455 V vs. SHE). Cyclic voltammetry of this process indicates the success of electrochemical solid-state crosslinking.

The visible transmission spectrum of fibers of 5, after electrochemical solid-state oxidative crosslinking and subsequent electrochemical reduction, exhibits and absorption maxima at 540 nm (2.30 eV). Importantly this $\lambda_{max}$ is red shifted compared to that of polymer 5 films prepared using solid-state oxidative crosslinking in a similar fashion (445 nm). To explain this observation, it is postulated that a backbone conformational change of ICP precursor 3 occurs during the electrospinning process and aligns, in turn, the terthiophene groups with each other, resulting in longer conjugation after solid-state oxidative crosslinking.

Fiber mats of 3, due to a refractive index mismatch between air and the polymer, are white in appearance. After solid-state oxidative crosslinking to convert 3 to 4, the fiber mat becomes dark blue in appearance. Upon subsequent reduction of 4 to 5, the fiber mat is orange.

Example 1e

Formation of a Solid-State Electrochromic Device

Five micrometer thick fiber mats of 3 were electrospun onto 3"×3" ITO coated glass and then converted to 4 via electrochemical solid-state crosslinking in TBAP/CH$_3$CN. When assembled into a 3"×3" solid-state electrochromic device containing the layers Glass/ITO/fiber mat of 3/liquid electrolyte/ITO/Glass, the fiber mat became transparent due to a refractive index match between the polymer 4 fiber and the polymer gel electrolyte that fills the interstices of the fiber mat. Upon switching the device between 0 V and 1.2 V, the electrochromic window underwent a change from transmissive deep blue to transmissive orange with a switch speed of approximately 2 seconds. The switch speed was surprisingly fast considering the fiber mat is five micrometers thick. It is believed that the nanoporous structure of the mat allows for the rapid diffusion of charge compensating ions in and out of the fiber during redox switching.

Example 2

Aligned Conjugated Polymer Fiber

Figure 3A:
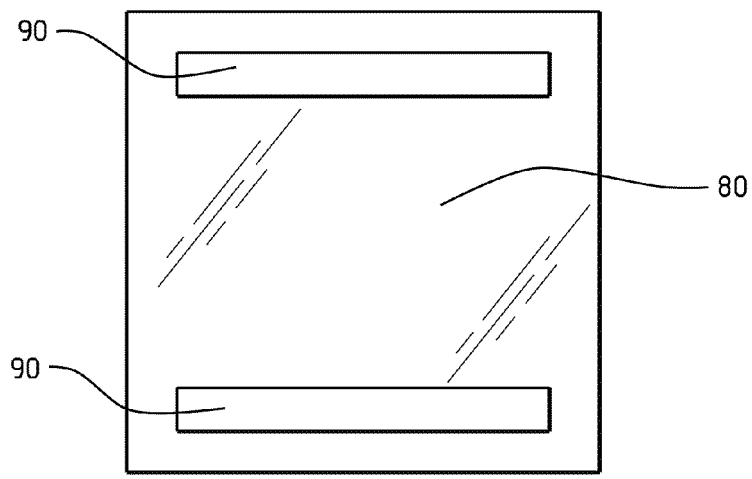
FIG. 3a. illustrates a generalized schematic of a system to prepare aligned conjugated polymer fiber.
Figure 3B:
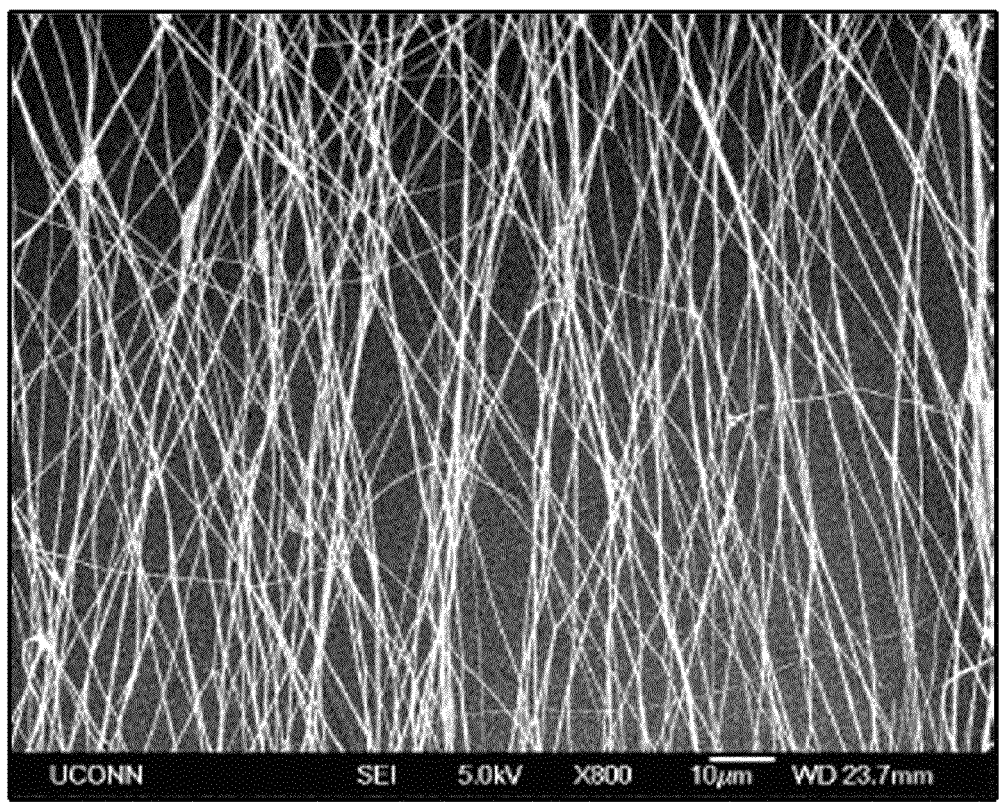
FIG. 3b. is an FESEM image of aligned conjugated polymer fiber.

FIG. 3a. illustrates a generalized schematic of a system to prepare aligned conjugated polymer fiber from ICP precursor 3 by electrospinning a 3 wt % polymer solution of ICP precursor 3 in THF/DMF 70:30 by weight of the two solvents. The feed rate of the solution was 0.01 ml/hr. Two metallic leads (90), both at ground, are separated across a glass substrate (80). The electrodes were placed 1.6 cm apart with an electrode width of 0.2 cm. Contact is made at both leads and at the capillary tip while applying 1 kV/cm with a 10 cm distance, to give a total of 10 kV. Electrospinning results in the formation of conjugated polymer fibers aligned between the metal leads (90). FIG. 3b. is a FESEM image of aligned conjugated polymer fiber.

Example 3

Micropatterning of Conjugated Polymer Fiber

Example 3a

Preparation of ICP Precursor

Scheme 3.

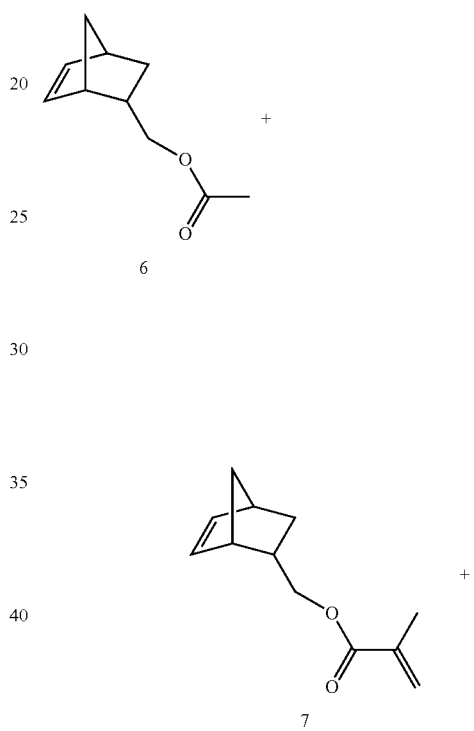

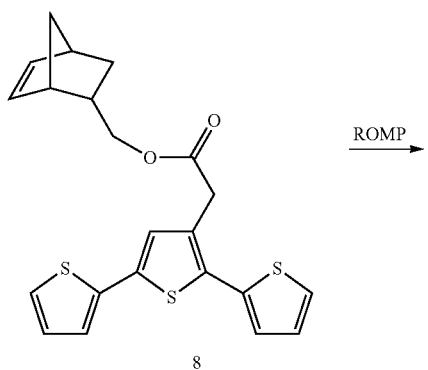

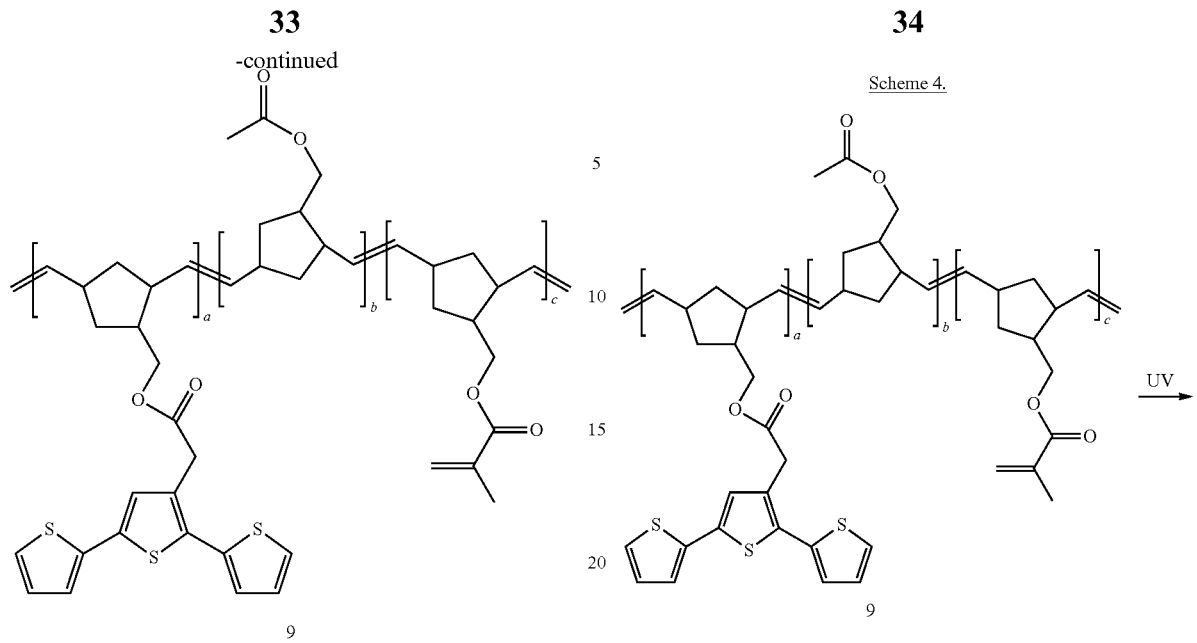

9

Scheme 4.

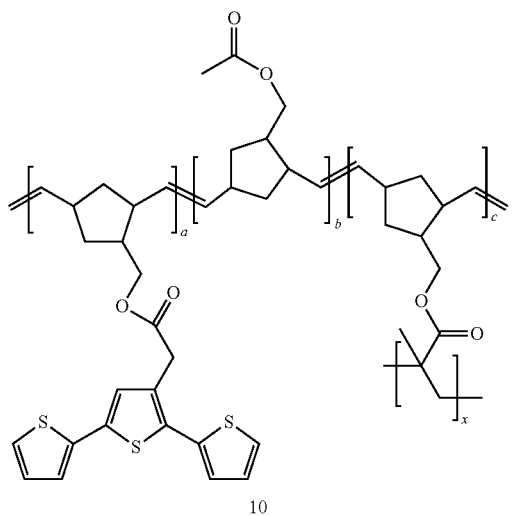

9

10

The ICP precursor 9 (a=0.50, b=0.44, c=0.06) was prepared by random copolymerization of monomers 6 ((bicyclo[2.2.1]hept-5-en-2-yl) methylacetate), 7 ((bicyclo[2.2.1]hept-5-en-2-yl)methyl methacrylate) and 8 ((bicyclo[2.2.1]hept-5-en-2-yl)methyl 2-(2,5-di(thiophen-2-yl)thiophen-3-yl)acetate) in a molar ratio of 0.44, 0.06, and 0.50 respectively, via ring opening metathesis polymerization (ROMP) using Grubbs' catalyst. 2.1 mmol of monomer 6, 0.3 mmol of monomer 7, and 2.4 mmol of monomer 8 were dissolved in 20 ml of dry methylene chloride and transferred via cannular into a 100 ml Schlenk flask, previously vacuum dried and nitrogen purged. A solution under nitrogen containing 0.02 mg (0.024 mmol) of Grubbs' alkylidene catalyst and 2 ml of methylene chloride was then cannulated into the Schlenk flask at room temperature. The mixture was allowed to stir for one hour followed by the irreversible termination by the addition of 0.5 ml of ethyl vinyl ether. The solution was then concentrated under vacuum. The polymer 9 was precipitated 3 times in pentane (300 ml), filtered and then dried under vacuum. The number average molecular weight of the ICP precursor 9 was measured to be 85,350 g/mol as determined by gel permeation chromatography (GPC). The ICP precursor exhibited a polydispersity index of 1.617 and a $T_g$ of 55° C.

Micropatterning Process

A micropatterning process is generally illustrated in FIG. 4. The ICP precursor 9 is spun into a fiber mat (110) onto a glass substrate (100) according to the procedure described in Example 1b above. The resulting fiber mat (110) of ICP precursor 9 is then exposed to UV light ($\lambda$=365 nm, I=5800 $\mu w/cm^2$) in the presence of 2,2-dimethoxy-2-phenylacetophenone (5 wt % to the polymer) for 1 minute through a photomask having 40 $\mu m$ width lines of chromium to block the UV light with a gap of 60 $\mu m$ between lines. Negative pattern to the mask, 40 $\mu m$ lines of 9, is developed by washing away the un-crosslinked part with chloroform to leave a patterned structure of photocrosslinked polymer mat of photocrosslinked polymer fiber 10 (Scheme 4) on the substrate.

The photocrosslinked polymer mat (130) is then converted to conjugated fibers (140) via electrochemical or chemical solid-state oxidative crosslinking according to the procedures of Example 1, followed by reduction with hydrazine hydrate. Scheme 5 illustrates the conjugated polymer fiber 11. FIG. 5a. is a Field Emission Scanning Electron Microscope image of micropatterned lines of conjugated polymer fibers. The pale lines are the substrate and the darker lines are the conjugated polymer fiber mat. FIG. 5b. is a close-up of the image of FIG. 5a.; the dark line shown in lower right corner is the edge of the pattern where the ICP precursor polymer mat was removed in the development step.

Scheme 5.

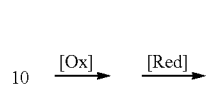

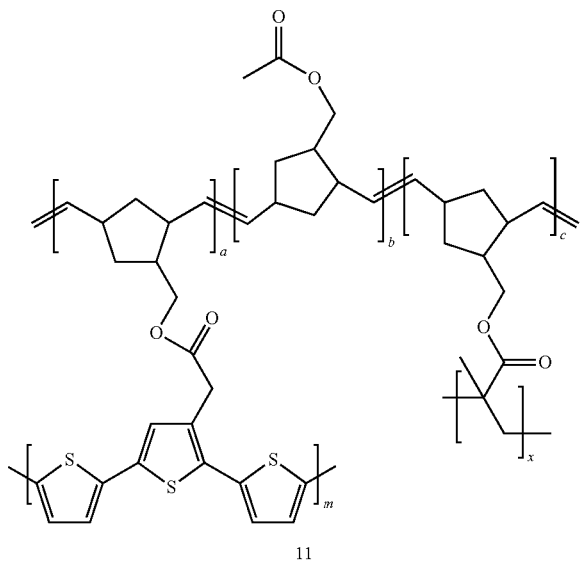

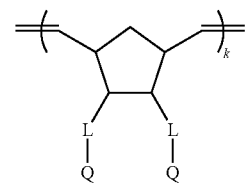

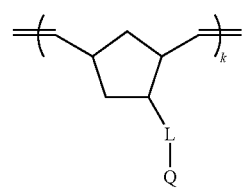

wherein k is about 10 to about 3000;
L is an ester, amide, carbamate, carbonate, ether, thioether, amine, alkylene, or arylene linking group;
each Q is independently 3,4-ethylenedioxythiophene, 3,4-propylenedioxythiophene, 3,4-propylenedithiathiophene, 3,4-ethylenedithiathiophene, isathianaphthene, pyridothiophene, pyrizinothiophene, pyrrole, 3,4-ethylenedioxypyrrole, 3,4-ethylenedithiinopyrrole, 3,4-propylenedioxypyrrole, 3,4-propylenedithiinopyrrole, aniline, thionapthene, benzofuran, polyindole, dibenzothiophene, dibenzofuran, carbazole, bifuran, bipyrrole, thienothiophene, thienofuran, thienopyrrole, furanylpyrrole, furanylfuran, pyyrolylpyrrole, thieno[3,4-b]thiophene, thieno[3,4-b]furan, terfuran, or terpyrrole, wherein the foregoing are optionally substituted with alkyl, alkoxy, haloalkyl, haloalkoxy, or aryl substituent;

The terms "a" and "an" herein do not denote a limitation of quantity, but rather denote the presence of at least one of the referenced item. All ranges disclosed herein are inclusive and combinable. All cited patents, patent applications, and other references are incorporated herein by reference in their entirety.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A method of preparing a conjugated polymer fiber, comprising:
   electrospinning a solution consisting of a solvent and an intrinsically conductive polymer precursor to form a fiber; and
   subsequently, crosslinking the intrinsically conductive polymer precursor by chemical solid-state oxidation or electrochemical solid-state oxidation to form a conjugated polymer fiber, wherein the intrinsically conductive polymer precursor comprises a polynorbornylene according to the structure (XLII), (XLIII), (XLIV), (XLV), (XLVI), or (XLVII):

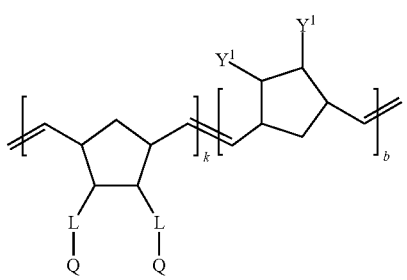

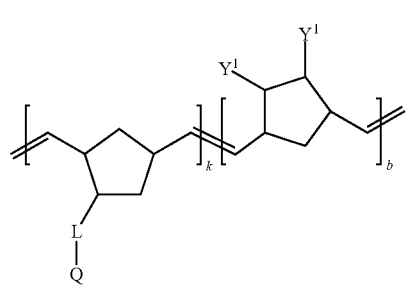

wherein k is about 10 to about 3000;
b is about 1 to about 3000;
L is an ester, amide, carbamate, carbonate, ether, thioether, amine, alkylene, or arylene linking group;
each Q is independently 3,4-ethylenedioxythiophene, 3,4-propylenedioxythiophene, 3,4-propylenedithiathiophene, 3,4-ethylenedithiathiophene, isathianaphthene, pyridothiophene, pyrizinothiophene, pyrrole, 3,4-ethylenedioxypyrrole, 3,4-ethylenedithiinopyrrole, 3,4-propylenedioxypyrrole, 3,4-propylenedithiinopyrrole, aniline, thionapthene, benzofuran, polyindole, dibenzothiophene, dibenzofuran, carbazole, bifuran, bipyrrole, thienothiophene, thienofuran, thienopyrrole, furanylpyrrole, furanylfuran, pyyrolylpyrrole, thieno[3,4-b]thiophene, thieno[3,4-b]furan, terfuran, or terpyrrole, wherein the foregoing are optionally substituted with alkyl, alkoxy, haloalkyl, haloalkoxy, or aryl substituent;

each $Y^1$ is independently hydrogen, alkyl, haloalkyl, alkoxy, haloalkoxy, aryl, or alkylacetate;

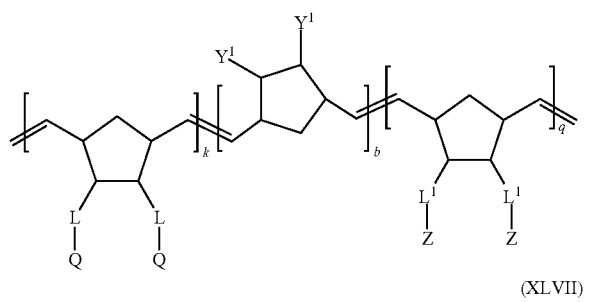

(XLVI)

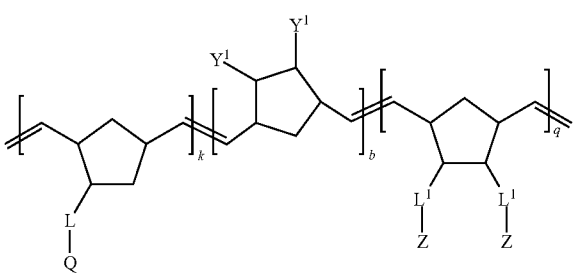

(XLVII)

wherein k is about 10 to about 3000;

b is about 1 to about 3000;

q is about 1 to about 3000;

each L and $L^1$ is an ester, amide, carbamate, carbonate, ether, thioether, amine, alkylene, or arylene linking group;

each Q is independently 3,4-ethylenedioxythiophene, 3,4-propylenedioxythiophene, 3,4-propylenedithiathiophene, 3,4-ethylenedithiathiophene, isathianaphthene, pyridothiophene, pyrizinothiophene, pyrrole, 3,4-ethylenedioxypyrrole, 3,4-ethylenedithiinopyrrole, 3,4-propylenedioxypyrrole, 3,4-propylenedithiinopyrrole, aniline, thionapthene, benzofuran, polyindole, dibenzothiophene, dibenzofuran, carbazole, bifuran, bipyrrole, thienothiophene, thienofuran, thienopyrrole, furanylpyrrole, furanylfuran, pyyrolylpyrrole, thieno[3,4-b]thiophene, thieno[3,4-b]furan, terfuran, or terpyrrole, wherein the foregoing are optionally substituted with alkyl, alkoxy, haloalkyl, haloalkoxy, or aryl substituent;

each $Y^1$ is independently hydrogen, alkyl, haloalkyl, alkoxy, haloalkoxy, aryl, or alkylacetate; and each Z is independently vinyl, acryloyl, methacryloyl, acrylamido, or methacrylamido.

2. A method of preparing a conjugated polymer fiber, comprising:
electrospinning a solution consisting of a solvent and an intrinsically conductive polymer precursor to form a fiber; and
subsequently, crosslinking the intrinsically conductive polymer precursor by chemical solid-state oxidation or electrochemical solid-state oxidation to form a conjugated polymer fiber, wherein the intrinsically conductive polymer precursor comprises the ring opening metathesis polymerization product of a thiophene-containing norbornylene compound, wherein the thiophene-containing norbornylene compound is (bicyclo[2.2.1]hept-5-en-2-yl)methyl 2-(2,5-di(thiophen-3-yl)thiophen-3-yl)acetate, ((bicyclo[2.2.1]hept-5-en-2-yl)2-(2,5-di(thiophen-3-yl)thiophen-3-yl)acetate), or a combination comprising at least one of the foregoing thiophene-containing norbornylene compounds,
optionally further comprising polymerizing the thiophene-containing norbornylene compound in the presence of (bicyclo[2.2.1]hept-5-en-2-yl)methyl acetate), ((bicyclo[2.2.1]hept-5-en-2-yl)acetate), ((bicyclo[2.2.1]hept-5-en-2-yl)acrylate), ((bicyclo[2.2.1]hept-5-en-2-yl)methacrylate), or a combination comprising at least one of the foregoing, wherein the acetate is optionally substituted with an alkyl, haloalkyl, or aryl group.

3. The method of claim 1, wherein the solution comprises the intrinsically conductive polymer or intrinsically conductive polymer precursor in an amount of about 1 to about 15 weight percent based on the total weight of the solution.

4. The method of claim 1, wherein the conjugated polymer fiber is a nanofiber.

5. A conjugated polymer fiber prepared by the method comprising
electrospinning a solution consisting of a solvent and an intrinsically conductive polymer precursor to form a fiber; and
subsequently, crosslinking the intrinsically conductive polymer precursor by chemical solid-state oxidation or electrochemical solid-state oxidation to form a conjugated polymer fiber,
wherein the conjugated polymer fiber has a diameter of about 1 to about 500 nanometers, and wherein the intrinsically conductive polymer precursor comprises a polynorbornylene according to the structure (XLII), (XLIII), (XLIV), (XLV), (XLVI) or (XLVII):

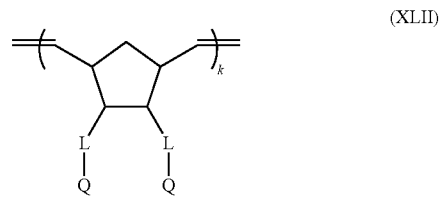

(XLII)

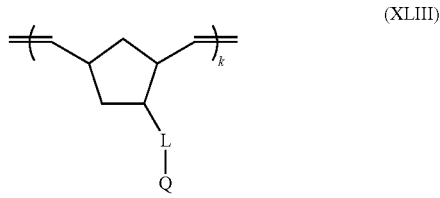

(XLIII)

wherein k is about 10 to about 3000;

L is an ester, amide, carbamate, carbonate, ether, thioether, amine, alkylene, or arylene linking group;

each Q is independently 3,4-ethylenedioxythiophene, 3,4-propylenedioxythiophene, 3,4-propylenedithiathiophene, 3,4-ethylenedithiathiophene, isathianaphthene, pyridothiophene, pyrizinothiophene, pyrrole, 3,4-ethylenedioxypyrrole, 3,4-ethylenedithiinopyrrole, 3,4-propylenedioxypyrrole, 3,4-propylenedithiinopyrrole, aniline, thionapthene, benzofuran, polyindole, dibenzothiophene, dibenzofuran, carbazole, bifuran, bipyrrole, thienothiophene, thienofuran, thienopyrrole, furanylpyrrole, furanylfuran, pyyrolylpyrrole, thieno[3,4-b]thiophene, thieno[3,4-b]furan, terfuran, or terpyrrole, wherein the foregoing are optionally substituted with alkyl, alkoxy, haloalkyl, haloalkoxy, or aryl substituent;

(XLIV)

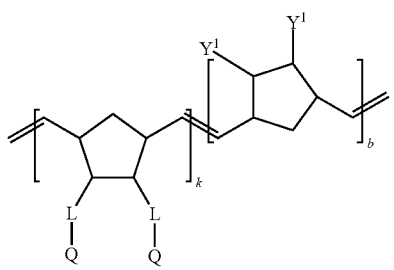

(XLV)

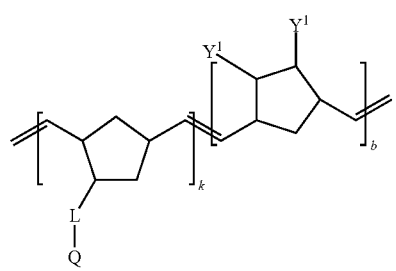

wherein k is about 10 to about 3000;

b is about 1 to about 3000;

L is an ester, amide, carbamate, carbonate, ether, thioether, amine, alkylene, or arylene linking group;

each Q is independently 3,4-ethylenedioxythiophene, 3,4-propylenedioxythiophene, 3,4-propylenedithiathiophene, 3,4-ethylenedithiathiophene, isathianaphthene, pyridothiophene, pyrizinothiophene, pyrrole, 3,4-ethylenedioxypyrrole, 3,4-ethylenedithiinopyrrole, 3,4-propylenedioxypyrrole, 3,4-propylenedithiinopyrrole, aniline, thionapthene, benzofuran, polyindole, dibenzothiophene, dibenzofuran, carbazole, bifuran, bipyrrole, thienothiophene, thienofuran, thienopyrrole, furanylpyrrole, furanylfuran, pyyrolylpyrrole, thieno[3,4-b]thiophene, thieno[3,4-b]furan, terfuran, or terpyrrole, wherein the foregoing are optionally substituted with alkyl, alkoxy, haloalkyl, haloalkoxy, or aryl substituent;

each $Y^1$ is independently hydrogen, alkyl, haloalkyl, alkoxy, haloalkoxy, aryl, or alkylacetate;

(XLVII)

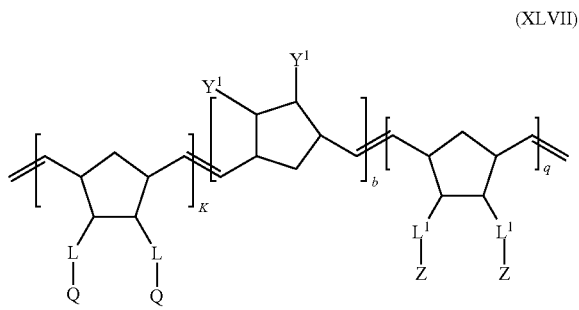

(XLVII)

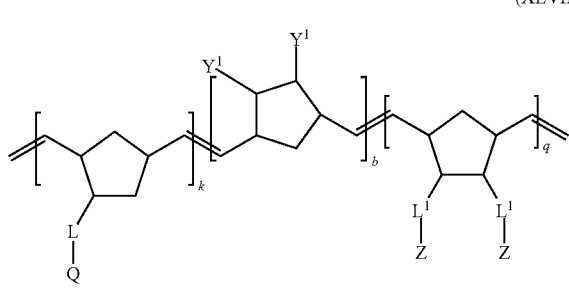

wherein k is about 10 to about 3000;

b is about 1 to about 3000;

q is about 1 to about 3000;

each L and $L^1$ is an ester, amide, carbamate, carbonate, ether, thioether, amine, alkylene, or arylene linking group;

each Q is independently 3,4-ethylenedioxythiophene, 3,4-propylenedioxythiophene, 3,4-propylenedithiathiophene, 3,4-ethylenedithiathiophene, isathianaphthene, pyridothiophene, pyrizinothiophene, pyrrole, 3,4-ethylenedioxypyrrole, 3,4-ethylenedithiinopyrrole, 3,4-propylenedioxypyrrole, 3,4-propylenedithiinopyrrole, aniline, thionapthene, benzofuran, polyindole, dibenzothiophene, dibenzofuran, carbazole, bifuran, bipyrrole, thienothiophene, thienofuran, thienopyrrole, furanylpyrrole, furanylfuran, pyyrolylpyrrole, thieno[3,4-b]thiophene, thieno[3,4-b]furan, terfuran, or terpyrrole, wherein the foregoing are optionally substituted with alkyl, alkoxy, haloalkyl, haloalkoxy, or aryl substituent;

each $Y^1$ is independently hydrogen, alkyl, haloalkyl, alkoxy, haloalkoxy, aryl, or alkylacetate; and each Z is independently vinyl, acryloyl, methacryloyl, acrylamido, or methacrylamido.

6. The conjugated polymer fiber of claim 5, wherein the intrinsically conductive polymer precursor comprises a polynorbornylene according to the structure (XLII), (XLIII), (XLIV), (XLV), (XLVI) or (XLVII):

(XLII)

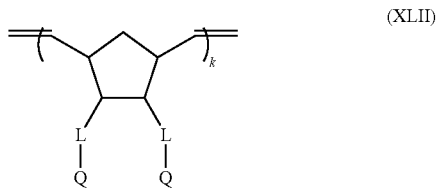

-continued

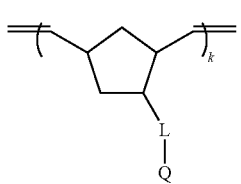
(XLIII)

wherein k is about 10 to about 3000;
L is an ester, amide, ether, or alkylene linking group;
each Q is independently 3,4-ethylenedioxythiophene, 3,4-ethylenedithiathiophene, 3,4-propylenedioxythiophene, 3,4-propylenedithiathiophene, pyridothiophene, pyrizinothiophene, dibenzothiophene, dibenzofuran, bifuran, thienothiophene, thienofuran, thieno[3,4-b]thiophene, or thieno[3,4-b]furan wherein the foregoing are optionally substituted with alkyl, alkoxy, haloalkyl, haloalkoxy, or aryl substituent;

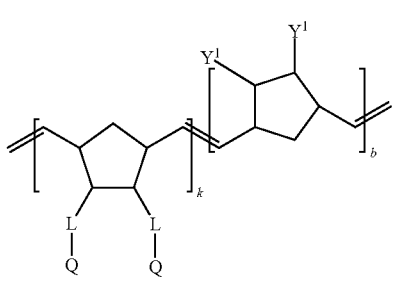
(XLIV)

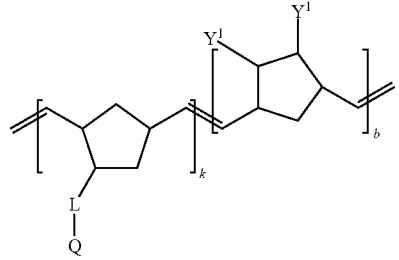
(XLV)

wherein k is about 10 to about 3000;
b is about 1 to about 3000;
L is an ester, amide, ether, or alkylene linking group;
each Q is independently 3,4-ethylenedioxythiophene, 3,4-ethylenedithiathiophene, 3,4-propylenedioxythiophene, 3,4-propylenedithiathiophene, pyridothiophene, pyrizinothiophene, dibenzothiophene, dibenzofuran, bifuran, thienothiophene, thienofuran, thieno[3,4-b]thiophene, or thieno[3,4-b]furan, wherein the foregoing are optionally substituted with alkyl, alkoxy, haloalkyl, haloalkoxy, or aryl substituent;
each $Y^1$ is independently hydrogen, alkyl, haloalkyl, alkoxy, haloalkoxy, aryl, or alkylacetate;

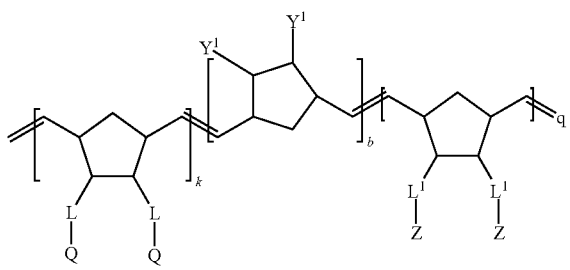
(XLVI)

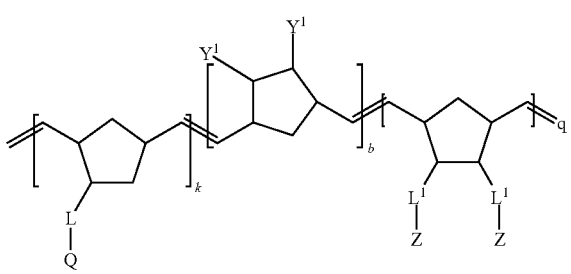
(XLVII)

wherein k is about 10 to about 3000;
b is about 1 to about 3000;
q is about 1 to about 3000;
each L and $L^1$ is an ester, amide, ether, or alkylene linking group;
each Q is independently 3,4-ethylenedioxythiophene, 3,4-ethylenedithiathiophene, 3,4-propylenedioxythiophene, 3,4-propylenedithiathiophene, pyridothiophene, pyrizinothiophene, dibenzothiophene, dibenzofuran, bifuran, thienothiophene, thienofuran, thieno[3,4-b]thiophene, or thieno[3,4-b]furan, wherein the foregoing are optionally substituted with alkyl, alkoxy, haloalkyl, haloalkoxy, or aryl substituent;
each $Y^1$ is independently hydrogen, alkyl, haloalkyl, alkoxy, haloalkoxy, aryl, or alkylacetate; and
each Z is independently vinyl, acryloyl, methacryloyl, acrylamido, or methacrylamido.

7. The conjugated polymer fiber of claim 5, wherein the intrinsically conductive polymer precursor comprises a polynorbornylene according to the structure (XLII), (XLIII), (XLIV), (XLV), (XLVI) or (XLVII):

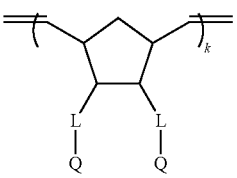
(XLII)

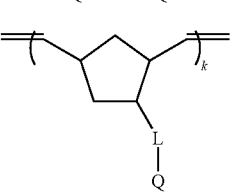
(XLIII)

wherein k is 1 to about 3000;

L is an ester, ether, or alkylene linking group;

each Q is independently 3,4-ethylenedioxythiophene, 3,4-ethylenedithiathiophene, 3,4-propylenedioxythiophene, 3,4-propylenedithiathiophene, pyridothiophene, pyrizinothiophene, dibenzothiophene, thienothiophene, or thieno[3,4-b]thiophene, wherein the foregoing are optionally substituted with alkyl, alkoxy, haloalkyl, haloalkoxy, or aryl substituent;

(XLIV) or (XLV):

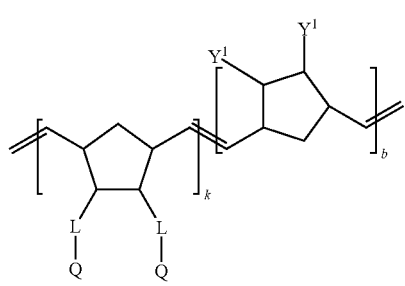

(XLIV)

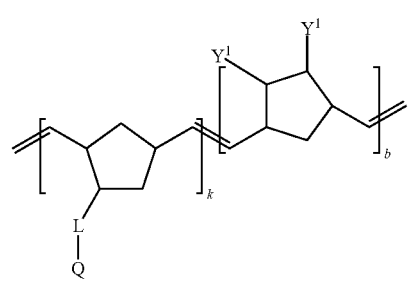

(XLV)

wherein k is about 10 to about 3000;

b is about 1 to about 3000;

L is an ester, ether, or alkylene linking group;

each Q is independently 3,4-ethylenedioxythiophene, 3,4-ethylenedithiathiophene, 3,4-propylenedioxythiophene, 3,4-propylenedithiathiophene, pyridothiophene, pyrizinothiophene, dibenzothiophene, thienothiophene, or thieno[3,4-b]thiophene, wherein the foregoing are optionally substituted with alkyl, alkoxy, haloalkyl, haloalkoxy, or aryl substituent;

each $Y^1$ is independently hydrogen, alkyl, haloalkyl, alkoxy, haloalkoxy, aryl, or alkylacetate;

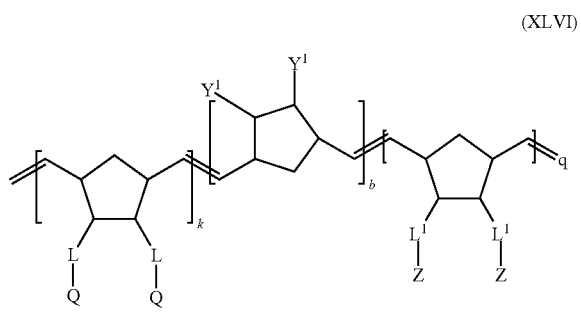

(XLVI)

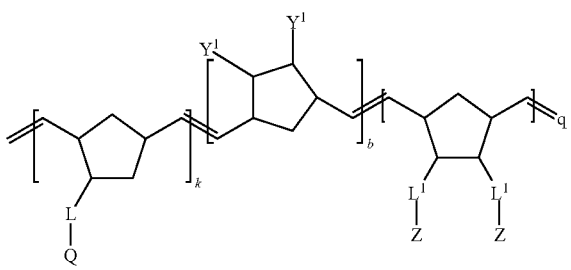

(XLVII)

wherein k is about 10 to about 3000;

b is about 1 to about 3000;

q is about 1 to about 3000;

each L and $L^1$ is an ester, ether, or alkylene linking group;

each Q is independently 3,4-ethylenedioxythiophene, 3,4-ethylenedithiathiophene, 3,4-propylenedioxythiophene, 3,4-propylenedithiathiophene, pyridothiophene, pyrizinothiophene, dibenzothiophene, thienothiophene, or thieno[3,4-b]thiophene, wherein the foregoing are optionally substituted with alkyl, alkoxy, haloalkyl, haloalkoxy, or aryl substituent;

each $Y^1$ is independently hydrogen, alkyl, haloalkyl, alkoxy, haloalkoxy, aryl, or alkylacetate; and each Z is independently vinyl, acryloyl, methacryloyl, acrylamido, or methacrylamido.

8. A conjugated polymer fiber prepared by the method comprising electrospinning a solution consisting of a solvent and an intrinsically conductive polymer precursor to form a fiber; and subsequently, crosslinking the intrinsically conductive polymer precursor by chemical solid-state oxidation or electrochemical solid-state oxidation to form a conjugated polymer fiber, wherein the conjugated polymer fiber has a diameter of about 1 to about 500 nanometers, and wherein the intrinsically conductive polymer precursor comprises the ring opening metathesis polymerization product of a thiophene-containing norbornylene compound, wherein the thiophene-containing norbornylene compound is (bicyclo[2.2.1]hept-5-en-2-yl)methyl 2-(2,5-di(thiophen-3-yl)thiophen-3-yl)acetate, ((bicyclo[2.2.1]hept-5-en-2-yl) 2-(2,5-di(thiophen-3-yl)thiophen-3-yl) acetate), or a combination comprising at least one of the foregoing thiophene-containing norbornylene compounds, optionally further comprising polymerizing the thiophene-containing norbornylene compound in the presence of (bicyclo[2.2.1]hept-5-en-2-yl)methyl acetate), ((bicyclo[2.2.1]hept-5-en-2-yl)acetate), ((bicyclo[2.2.1]hept-5-en-2-yl)acrylate), ((bicyclo[2.2.1]hept-5-en-2-yl) methacrylate), or a combination comprising at least one of the foregoing, wherein the acetate is optionally substituted with an alkyl, haloalkyl, or aryl group.

9. A structure comprising the conjugated polymer fiber of claim 5, wherein the structure is a nonwoven mat or a mat comprising aligned conjugated polymer fibers.

10. The structure of claim 9, wherein the conjugated polymer fiber is laterally fused by exposure to solvent vapor.

11. The conjugated polymer fiber of claim 5, wherein the fiber comprises a wavelength switching capability between the infrared region, visible region, microwave region, or a combination thereof.

12. An article prepared from the conjugated polymer fiber of claim 5.

13. The article of claim 12, wherein the article is an electrochromic window or display device.

14. A structure comprising the conjugated polymer fiber of claim 8, wherein the structure is mat.

* * * * *